United States Patent [19]

Sakai et al.

[11] Patent Number: 5,557,437
[45] Date of Patent: Sep. 17, 1996

[54] OPTICAL TERMINAL SYSTEM HAVING SELF-MONITORING FUNCTION

[75] Inventors: Toshiharu Sakai; Yoshinori Nakamura; Takashi Umegaki; Nobuo Iguchi; Miki Hagino; Hiroaki Mori; Toshikazu Ota, all of Osaka; Akihiko Oka, Kanagawa; Kazuo Takatsu, Kanagawa; Nobuyuki Nemoto, Kanagawa, all of Japan

[73] Assignee: Fujitsu Limited, Kanagawa, Japan

[21] Appl. No.: 487,444

[22] Filed: Jun. 7, 1995

[30] Foreign Application Priority Data

Sep. 29, 1994 [JP] Japan ................... 6-234913

[51] Int. Cl.⁶ ............................ H04B 10/08; H04B 10/00
[52] U.S. Cl. ................ 359/110; 359/143; 359/152; 359/158; 359/166
[58] Field of Search ............................ 359/110, 115, 359/135, 143, 152, 158, 166, 177, 187, 194

[56] References Cited

U.S. PATENT DOCUMENTS 4,256,485 10/1982 Boschuete et al. .............. 359/143
5,075,792 12/1991 Brown et al. ..................... 359/192
5,172,260 12/1992 Takatsu ........................... 359/158

FOREIGN PATENT DOCUMENTS 56-141641 11/1981 Japan.

*Primary Examiner*—Leo Boudreau
*Assistant Examiner*—Kinfe-Michael Negash

[57] ABSTRACT

An optical terminal system having self-monitoring function is disclosed, which includes a high-level group loopback section for internally looping back a serial electric signal, a low-level group loopback section for internally looping back a parallel electric signal, a self-loop section for connecting a receiver device and a transmitter device to loop an electric signal received by the receiver device directly to the transmitter device, and a self-monitoring controller for performing a self-monitoring test on respective components of the receiver device and transmitter device by using the self-loop section and either one of the high-level group loopback section and the low-level group loopback section. The optical terminal system can selfcheck the functions thereof through self-monitoring without depending on a network.

11 Claims, 38 Drawing Sheets

| FRAME NO. | CH1 OUT / CH1 IN | CH2 OUT / CH2 IN | CH3 OUT / CH3 IN | CH4 OUT / CH4 IN | CH5 OUT / CH5 IN | CH6 OUT / CH6 IN | CH7 OUT / CH7 IN | CH8 OUT / CH8 IN | CH9 OUT / CH9 IN | CH10 OUT / CH10 IN | CH11 OUT / CH11 IN | CH12 OUT / CH12 IN |
|---|---|---|---|---|---|---|---|---|---|---|---|---|
| 1 | NDF | | | | | | | | | | | |
| 2 | | | | | | | | | | | | |
| 3 | | NDF | | | | | | | | | | |
| 4 | | | | | | | | | | | | |
| 5 | DEC | | NDF | | | | | | | | | |
| 6 | | | | | | | | | | | | |
| 7 | | | | NDF | | | | | | | | |
| 8 | | | | | | | | | | | | |
| 9 | DEC | | | | NDF | | | | | | | |
| 10 | | | | | | | | | | | | |
| 11 | | | | | | NDF | | | | | | |
| 12 | | | | | | | | | | | | |
| 13 | DEC | DEC | | | | | NDF | | | | | |
| 14 | | | | | | | | | | | | |
| 15 | | | | | | | | NDF | | | | |
| 16 | | | | | | | | | | | | |
| 17 | DEC | DEC | | | | | | | NDF | | | |
| 18 | | | | | | | | | | | | |
| 19 | | | | | | | | | | NDF | | |
| 20 | | | | | | | | | | | | |
| 21 | DEC | DEC | | | | | | | | | NDF | |
| 22 | | | | | | | | | | | | |
| 23 | | | DEC | | | | | | | | | NDF |
| 24 | | | | | | | | | | | | |
| 25 | DEC | | | | | | | | | | | NDF |
| 26 | | DEC | | | | | | | | | | |
| 27 | | | DEC | | | | | | | | | |
| 28 | | | | | | | | | | | | |
| 29 | DEC | DEC | | | | | | | | | | |
| 30 | | | | | | | | | | | | |
| 31 | | | DEC | | | | | | | | | |
| 32 | | | | DEC | | | | | | | | |
| 33 | DEC | | | | | | | | | | | |
| 34 | | DEC | | | | | | | | | | |
| 35 | | | DEC | | | | | | | | | |
| 36 | | | | DEC | | | | | | | | |
| 37 | DEC | DEC | | | | | | | | | | |
| 38 | | | | | | | | | | | | |
| 39 | | | DEC | | | | | | | | | |
| 40 | | | | DEC | | | | | | | | |
| 41 | DEC | DEC | | DEC | | | | | | | | |
| 42 | | | DEC | | | | | | | | | |
| 43 | | | DEC | | | | | | | | | |
| 44 | | | | DEC | | | | | | | | |
| 45 | DEC | | | DEC | | | | | | | | |
| 46 | | DEC | | | | | | | | | | |
| 47 | | | DEC | | | | | | | | | |
| 48 | | | | DEC | | | | | | | | |
| 49 | DEC | | | DEC | | | | | | | | |
| 50 | | DEC | | | DEC | | | | | | | |
| 51 | | | DEC | | | | | | | | | |
| 52 | | | | DEC | | | | | | | | |
| 53 | DEC | | | DEC | | | | | | | | |
| 54 | | DEC | | | DEC | | | | | | | |
| 55 | | | DEC | | | | | | | | | |
| 56 | | | | DEC | | | | | | | | |
| 57 | DEC | | | DEC | | | | | | | | |
| 58 | | DEC | | | DEC | | | | | | | |
| 59 | | | DEC | | | DEC | | | | | | |
| 60 | | | | DEC | | | | | | | | |

FIG. 35A

| FRAME NO. | CH1 OUT / CH1 IN | CH2 OUT / CH2 IN | CH3 OUT / CH3 IN | CH4 OUT / CH4 IN | CH5 OUT / CH5 IN | CH6 OUT / CH6 IN | CH7 OUT / CH7 IN | CH8 OUT / CH8 IN | CH9 OUT / CH9 IN | CH10 OUT / CH10 IN | CH11 OUT / CH11 IN | CH12 OUT / CH12 IN |
|---|---|---|---|---|---|---|---|---|---|---|---|---|
| 61 | DEC | | | | | | | | | | | |
| 62 | | DEC | | | | | | | | | | |
| 63 | | | DEC | | | | | | | | | |
| 64 | | | | DEC | | | | | | | | |
| 65 | DEC | | | | DEC | | | | | | | |
| 66 | | DEC | | | | DEC | | | | | | |
| 67 | | | DEC | | | | DEC | | | | | |
| 68 | | | | DEC | | | | DEC | | | | |
| 69 | DEC | | | | DEC | | | | | | | |
| 70 | | DEC | | | | DEC | | | | | | |
| 71 | | | DEC | | | | DEC | | | | | |
| 72 | | | | DEC | | | | DEC | | | | |
| 73 | DEC | | | | DEC | | | | | | | |
| 74 | | DEC | | | | DEC | | | | | | |
| 75 | | | DEC | | | | DEC | | | | | |
| 76 | | | | DEC | | | | DEC | | | | |
| 77 | DEC | | | | DEC | | | | DEC | | | |
| 78 | | DEC | | | | DEC | | | | | | |
| 79 | | | DEC | | | | DEC | | | | | |
| 80 | | | | DEC | | | | DEC | | | | |
| 81 | DEC | | | | DEC | | | | DEC | | | |
| 82 | | DEC | | | | DEC | | | | | | |
| 83 | | | DEC | | | | DEC | | | | | |
| 84 | | | | DEC | | | | DEC | | | | |
| 85 | DEC | | | | DEC | | | | DEC | | | |
| 86 | | DEC | | | | DEC | | | | DEC | | |
| 87 | | | DEC | | | | DEC | | | | | |
| 88 | | | | DEC | | | | DEC | | | | |
| 89 | DEC | | | | DEC | | | | DEC | | | |
| 90 | | DEC | | | | DEC | | | | DEC | | |
| 91 | | | DEC | | | | DEC | | | | | |
| 92 | | | DEC | | | | DEC | | | | | |
| 93 | DEC | | | | DEC | | | | DEC | | | |
| 94 | | DEC | | | | DEC | | | | DEC | | |
| 95 | | | DEC | | | | DEC | | | | DEC | |
| 96 | | | DEC | | | | DEC | | | | | |
| 97 | DEC | | | | DEC | | | | DEC | | | |
| 98 | | DEC | | | | DEC | | | | DEC | | |
| 99 | | | DEC | | | | DEC | | | | DEC | |
| 100 | | | | DEC | | | | DEC | | | | |
| 101 | DEC | | | | DEC | | | | DEC | | | |
| 102 | | DEC | | | | DEC | | | | DEC | | |
| 103 | | | DEC | | | | DEC | | | | DEC | |
| 104 | | | | DEC | | | | DEC | | | | DEC |
| 105 | DEC | | | | DEC | | | | DEC | | | |
| 106 | | DEC | | | | DEC | | | | DEC | | |
| 107 | | DEC | | | | DEC | | | | DEC | | |
| 108 | | | DEC | | | | DEC | | | | DEC | |
| 109 | DEC | | | | DEC | | | | DEC | | | |
| 110 | | DEC | | | | DEC | | | | DEC | | |
| 111 | | DEC | | | | DEC | | | | DEC | | |
| 112 | | | DEC | | | | DEC | | | | DEC | |
| 113 | DEC | | | | DEC | | | | DEC | | | DEC |
| 114 | | DEC | | | | DEC | | | | DEC | DEC | |
| 115 | | DEC | | | | DEC | | | | DEC | | |
| 116 | | | DEC | | | | DEC | | | | DEC | |
| 117 | DEC | | | | DEC | | | | DEC | | DEC | |
| 118 | | DEC | | | | DEC | | | | DEC | | DEC |
| 119 | | | DEC | | | | DEC | | | | DEC | |
| 120 | | | | DEC | | | | DEC | | | DEC | |

FIG. 35B

| FRAME NO. | CH1 OUT CH1 IN | CH2 OUT CH2 IN | CH3 OUT CH3 IN | CH4 OUT CH4 IN | CH5 OUT CH5 IN | CH6 OUT CH6 IN | CH7 OUT CH7 IN | CH8 OUT CH8 IN | CH9 OUT CH9 IN | CH10 OUT CH10 IN | CH11 OUT CH11 IN | CH12 OUT CH12 IN |
|---|---|---|---|---|---|---|---|---|---|---|---|---|
| 1 | NDF | — | | | | | | | | | | |
| 2 | | | | | | | | | | | | |
| 3 | | NDF | — | | | | | | | | | |
| 4 | | | | | | | | | | | | |
| 5 | INC | | NDF | — | | | | | | | | |
| 6 | | | | | | | | | | | | |
| 7 | | | | NDF | — | | | | | | | |
| 8 | | | | | | | | | | | | |
| 9 | INC | | | | NDF | — | | | | | | |
| 10 | | | | | | | | | | | | |
| 11 | | | | | | NDF | — | | | | | |
| 12 | | | | | | | | | | | | |
| 13 | INC | | | | | | NDF | — | | | | |
| 14 | | INC | | | | | | | | | | |
| 15 | | | | | | | | NDF | — | | | |
| 16 | | | | | | | | | | | | |
| 17 | INC | | | | | | | | NDF | — | | |
| 18 | | INC | | | | | | | | | | |
| 19 | | | | | | | | | | NDF | — | |
| 20 | | | | | | | | | | | | |
| 21 | INC | | | | | | | | | NDF | — | |
| 22 | | INC | | | | | | | | | | |
| 23 | | | INC | | | | | | | | NDF | — |
| 24 | | | | | | | | | | | | |
| 25 | INC | | | | | | | | | | | NDF |
| 26 | | INC | | | | | | | | | | |
| 27 | | | INC | | | | | | | | | |
| 28 | | | | | | | | | | | | |
| 29 | INC | | | | | | | | | | | |
| 30 | | INC | | | | | | | | | | |
| 31 | | | INC | | | | | | | | | |
| 32 | | | | INC | | | | | | | | |
| 33 | INC | | | | | | | | | | | |
| 34 | | INC | | | | | | | | | | |
| 35 | | | INC | | | | | | | | | |
| 36 | | | | INC | | | | | | | | |
| 37 | INC | | | | | | | | | | | |
| 38 | | INC | | | | | | | | | | |
| 39 | | | INC | | | | | | | | | |
| 40 | | | | INC | | | | | | | | |
| 41 | INC | | | | INC | | | | | | | |
| 42 | | INC | | | | | | | | | | |
| 43 | | | INC | | | | | | | | | |
| 44 | | | | INC | | | | | | | | |
| 45 | INC | | | | INC | | | | | | | |
| 46 | | INC | | | | | | | | | | |
| 47 | | | INC | | | | | | | | | |
| 48 | | | | INC | | | | | | | | |
| 49 | INC | | | | INC | | | | | | | |
| 50 | | INC | | | | INC | | | | | | |
| 51 | | | INC | | | | | | | | | |
| 52 | | | | INC | | | | | | | | |
| 53 | INC | | | | INC | | | | | | | |
| 54 | | INC | | | INC | | | | | | | |
| 55 | | INC | | | | | | | | | | |
| 56 | | | INC | | | | | | | | | |
| 57 | INC | | | INC | | | | | | | | |
| 58 | | INC | | | INC | | | | | | | |
| 59 | | | INC | | | INC | | | | | | |
| 60 | | | INC | | | | | | | | | |

FIG. 36A

| FRAME NO. | CH1 OUT CH1 IN | CH2 OUT CH2 IN | CH3 OUT CH3 IN | CH4 OUT CH4 IN | CH5 OUT CH5 IN | CH6 OUT CH6 IN | CH7 OUT CH7 IN | CH8 OUT CH8 IN | CH9 OUT CH9 IN | CH10 OUT CH10 IN | CH11 OUT CH11 IN | CH12 OUT CH12 IN |
|---|---|---|---|---|---|---|---|---|---|---|---|---|
| 61 | INC | | | | | | | | | | | |
| 62 | | INC | | | | | | | | | | |
| 63 | | | INC | | | | | | | | | |
| 64 | | | | INC | | | | | | | | |
| 65 | INC | | | | INC | | | | | | | |
| 66 | | INC | | | | INC | | | | | | |
| 67 | | | INC | | | | INC | | | | | |
| 68 | | | | INC | | | | INC | | | | |
| 69 | INC | | | | INC | | | | | | | |
| 70 | | INC | | | | INC | | | | | | |
| 71 | | | INC | | | | INC | | | | | |
| 72 | | | | INC | | | | INC | | | | |
| 73 | INC | | | | INC | | | | | | | |
| 74 | | INC | | | | INC | | | | | | |
| 75 | | | INC | | | | INC | | | | | |
| 76 | | | | INC | | | | INC | | | | |
| 77 | INC | | | | INC | | | | INC | | | |
| 78 | | INC | | | | INC | | | | | | |
| 79 | | | INC | | | | INC | | | | | |
| 80 | | | | INC | | | | INC | | | | |
| 81 | INC | | | | INC | | | | INC | | | |
| 82 | | INC | | | | INC | | | | | | |
| 83 | | | INC | | | | INC | | | | | |
| 84 | | | | INC | | | | INC | | | | |
| 85 | INC | | | | INC | | | | INC | | | |
| 86 | | INC | | | | INC | | | | INC | | |
| 87 | | | INC | | | | INC | | | | | |
| 88 | | | | INC | | | | INC | | | | |
| 89 | INC | | | | INC | | | | INC | | | |
| 90 | | INC | | | | INC | | | | INC | | |
| 91 | | | INC | | | | INC | | | | | |
| 92 | | | | INC | | | | INC | | | | |
| 93 | INC | | | | INC | | | | INC | | | |
| 94 | | INC | | | | INC | | | | INC | | |
| 95 | | | INC | | | | INC | | | | INC | |
| 96 | | | | INC | | | | INC | | | | |
| 97 | INC | | | | INC | | | | INC | | | |
| 98 | | INC | | | | INC | | | | INC | | |
| 99 | | | INC | | | | INC | | | | INC | |
| 100 | | | | INC | | | | INC | | | | |
| 101 | INC | | | | INC | | | | INC | | | |
| 102 | | INC | | | | INC | | | | INC | | |
| 103 | | | INC | | | | INC | | | | INC | |
| 104 | | | | INC | | | | INC | | | | INC |
| 105 | INC | | | | INC | | | | INC | | | |
| 106 | | INC | | | | INC | | | | INC | | |
| 107 | | | INC | | | | INC | | | | INC | |
| 108 | | | | INC | | | | INC | | | | INC |
| 109 | INC | | | | INC | | | | INC | | | |
| 110 | | INC | | | | INC | | | | INC | | |
| 111 | | | INC | | | | INC | | | | INC | |
| 112 | | | | INC | | | | INC | | | | INC |
| 113 | INC | | | | INC | | | | INC | | | INC |
| 114 | | INC | | | | INC | | | | INC | | |
| 115 | | | INC | | | | INC | | | | INC | |
| 116 | | | | INC | | | | INC | | | | INC |
| 117 | INC | | | | INC | | | | INC | | | INC |
| 118 | | INC | | | | INC | | | | INC | | |
| 119 | | | INC | | | | INC | | | | INC | |
| 120 | | | | INC | | | | INC | | | | INC |

FIG. 36B

OPTICAL TERMINAL SYSTEM HAVING SELF-MONITORING FUNCTION

BACKGROUND OF THE INVENTION

1. Field of the Invention

The present invention relates to an optical terminal system and, more particularly, to an optical terminal system for optical data transmission which is to be provided at the terminal of an optical data transmission line in an optical synchronous network.

2. Description of the Related Arts

In recent years, optical communications networks have been rapidly spread due to the development of optical fibers. As the characteristics of the optical fibers are improved, higher-speed data communications are increasingly required and, hence, optical terminal systems having improved functions have been developed.

Precise inspection of such a highly functional and highly integrated optical terminal system is difficult, thereby requiring significant time and labor for the setup and maintenance of the terminal system.

Conventionally, at the time of setup or maintenance of the optical terminal system, only principal functions thereof are briefly checked by an internal loopback test with an optical fiber cable, by a point-to-point test utilizing another optical terminal system, or by means of a dedicated jig connected thereto.

To check the entire function of the highly integrated terminal system which meets requirements of higher data transfer rate, however, functions of respective components (e.g., printed circuit board, module, LSI and the like) of the system should be separately checked by using different jigs and, at this time, the system should be disassembled for the functional check of the respective components thereof. Such an impractical checking method requires considerable time and labor.

Thus, the conventional optical terminal system cannot precisely self-check the functions thereof at the time of the setup and maintenance thereof, because the terminal system is highly functional and highly integrated.

In view of the foregoing, there is a need for an optical terminal system that can self-check the functions and performance thereof without depending on a network and without disassembling the terminal system, thereby significantly saving time and labor required for the setup and maintenance of the optical terminal system.

SUMMARY OF THE INVENTION

In accordance with the present invention, there is provided an optical terminal system having self-monitoring function, comprising: a receiving device including an optical/electric convertor for receiving an optical signal and converting the optical signal into an electric signal, a S/P convertor for converting the electric signal converted by the optical/electric convertor into a parallel electric signal, and a signal state detector for checking if the parallel electric signal is normal, then separating a low-level signal from the parallel electric signal and outputting the low-level signal; a transmitting device including a signal generator for switching a clock for the low-level electric signal and multiplexing the low-level electric signal into a high-level signal, a P/S convertor for converting the electric signal generated by the signal generator into a serial electric signal, and an electric/optical convertor for converting the serial electric signal into an optical signal and transmitting the optical signal; a system clock generator for generating a system clock which actuates the receiving device and transmitting device; a monitoring controller for controlling the receiving device and transmitting device and monitoring an alarm; a power source for supplying power to the receiving device, transmitting device, system clock generator and monitoring controller; a high-level group loopback section for connecting the P/S convertor of the transmitting device and the S/P convertor of the receiving device to internally loop back the serial electric signal; a low-level group loopback section for connecting the signal generator of the transmitting device and the signal state detector of the receiving device to internally loop back the parallel electric signal; a selfloopback section for connecting the signal state detector of the receiving device and the signal generator of the transmitting device to directly loop back the electric signal received by the receiving device to the transmitting device; and a self-monitoring controller for performing a self-monitoring test on the respective components of the receiving device and transmitting device by. using the self-loopback section and either of the high-level group loopback section and low-level group loopback section.

Since the optical terminal system of the present invention incorporates the high-level group loopback section, low-level group loopback section, set-loopback section and self-monitoring controller to test the functions of the respective components of the receiving device and transmitting device within the optical terminal system, the functional check of the respective components can be realized without depending on an external network and without disassembling the terminal system, thereby significantly saving time and labor required for the setup and maintenance of the optical terminal system.

BRIEF DESCRIPTION OF THE DRAWINGS

FIGS. 35A, 35B, 36A and 36B are diagrams for explaining a phase transition.

DETAILED DESCRIPTION OF THE PREFERRED EMBODIMENTS

Figure 1:
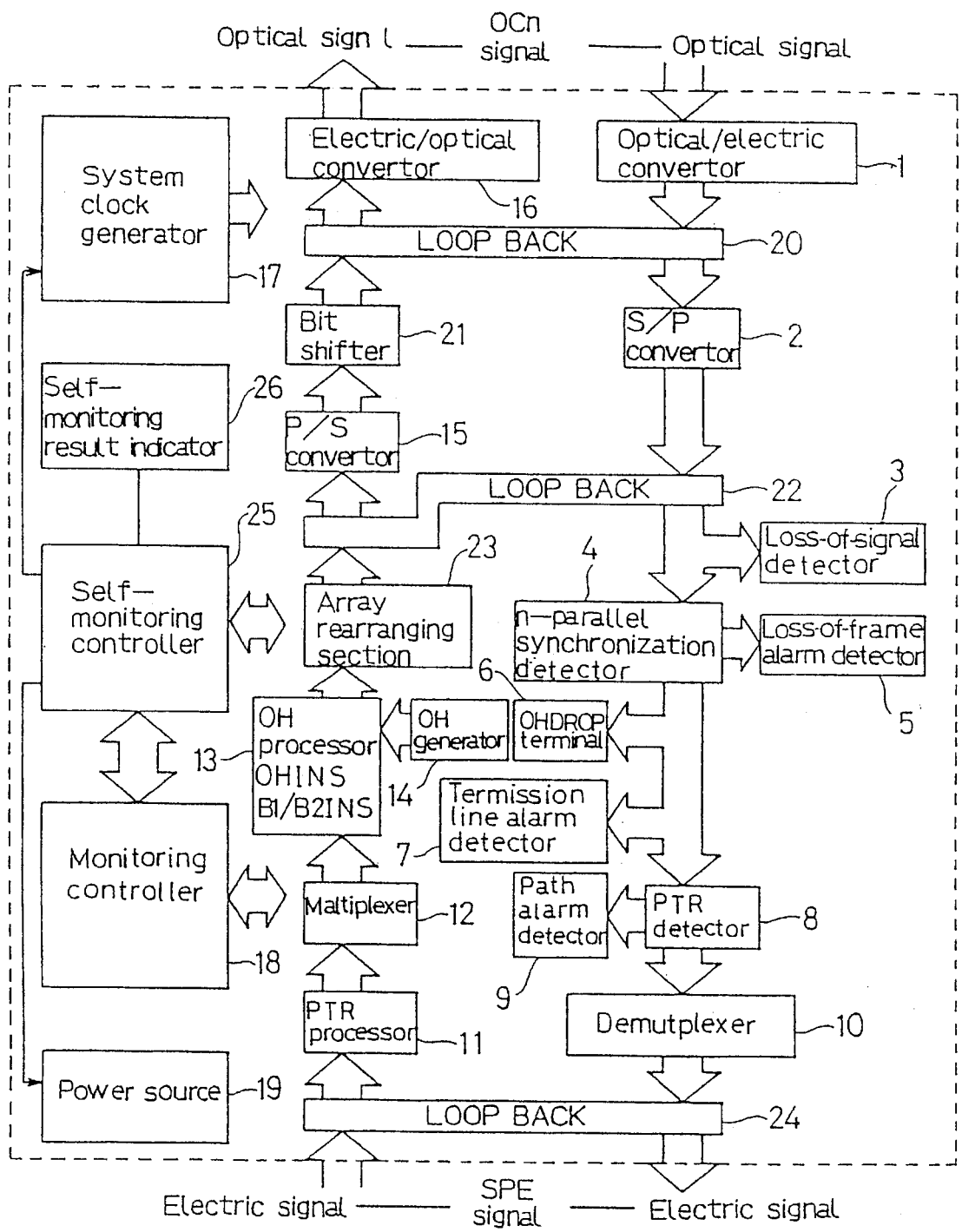
FIG. 1 is a block diagram illustrating a structure of an optical terminal system having self-monitoring function in accordance with one embodiment of the present invention.

The optical terminal system of the present invention preferably includes a bit shifter, provided between the P/S convertor of the transmitting device and the high-level group loopback section, for shifting the electric signal converted by the P/S convertor by one bit to facilitate a test for synchronization detection and cancellation.

The optical terminal system preferably includes an array rearranging section, provided between the signal generator of the transmitting device and the low-level group loopback section, for carrying out replacement of the signal generated by the signal generator to facilitate a synchronous test for the parallel signal.

Preferably, the self-monitoring test carried out by the self-monitoring controller is automatically started at the time of power supply actuation or started at any given time by the monitoring controller. This allows the optical terminal system to be tested always or at any given time, thereby ensuring the optical terminal system to be used at its best condition. Further, the maintenance thereof can be facilitated.

During the self-monitoring test performed by the self-monitoring controller, the output of an optical signal from the transmitting device is preferably stopped, thereby ensuring the safety of a maintenance engineer against a laser beam.

The self-monitoring controller preferably performs the self-monitoring test first by using the high-level group loopback section and then by using the low-level group loopback section, whereby a failure can be detected step by step from a high-level group to a low-level group in a trouble shooting for the respective components of the optical terminal system.

Preferably, the optical terminal system further includes an indicator for indicating a state and result of the self-monitoring test performed by the self-monitoring controller. The test states to be indicated by the indicator include "test stand-by", "under testing", "test normal termination", "test abnormal termination" and the like.

An operational margin for clock frequency is preferably checked by increasing the frequency of the system clock generated by the system clock generator during the self-monitoring test performed by the self-monitoring controller.

An operational margin for power supply is preferably checked by changing the voltage of the power supplied by the power source during the self-monitoring test performed by the self-monitoring section.

Preferably, the receiving device and transmitting device each include a plurality of channels, and the respective channels are tested by connecting the channels in tandem and passing a PN signal through the channels during the self-monitoring test performed by the self-monitoring section. This allows the plural channels to be checked at one time.

The present invention will hereinafter be described in detail by way of an embodiment thereof with reference to the attached drawings. It should be noted that the embodiment is not limitative of the present invention.

FIG. 1 is a block diagram illustrating a structure of an optical terminal system having self-monitoring function in accordance with one embodiment of the present invention.

As shown, the optical terminal system includes a receiver device having an optical/electric convertor (O/E) 1, an S/P convertor (S/P) 2, a loss-of-signal detector (LOS DET) 3, an n-parallel synchronization detector (SYNC) 4, a loss-of-frame alarm detector (LOF DET) 5, an overhead drop terminal (OH DROP) 6, a transmission line alarm detector 7, a pointer detector (PTR DET) 8, a path alarm detector 9, and a demultiplexer (DMUX) 10.

The optical/electric convertor 1 converts an optical signal (OC-n) into an electric signal (STS-n). The S/P convertor 2 serial/parallel-converts a high-speed electric signal STS-n into a low-speed parallel signal which is to be used by low-speed operation elements in a later process sequence.

The loss-of-signal detector 3 detects a loss-of-signal (LOS) state of a received signal. The n-parallel synchronization detector 4 detects a frame pattern for frame synchronization of the signal paralleled by the S/P convertor 2.

The loss-of-frame alarm detector 5 detects a loss-of-frame (LOF) alarm issued by the n-parallel synchronization detector 4 in a frame synchronization detection process. The overhead drop terminal 6 which has an overhead drop section extracts a section overhead (SOB) signal from an STS-n frame format.

The transmission line alarm detector 7 has detectors for detecting an error major/minor (ERR MAJ/MIN), line alarm indication signal (LAIS) and far-end-receive failure (FERF) alarm. The pointer detector 8 detects and monitors a virtual container (VC) head timing by H1- and H2-bytes in the SOB signal.

The path alarm detector 9 has detectors for respectively detecting a loss of pointer (LOP), path alarm indication signal (PAIS) and unequipment (UNEQ) alarm. The demultiplexer 10 demultiplexes the signal STS-n into a signal (SPE signal) equivalent to a signal STS-1.

The optical terminal system further includes a transmitter device having a PTR processor 11, a multiplexer 12, an overhead processor (OH) 13, an OH generator 14, a P/S convertor (P/S) 15, and an electric/optical convertor (E/O) 16.

The PTR processor 11 switches a transmission clock (CLK) and changes a pointer value for every SPE signal. The multiplexer 12 converts the SPE signal into the signal STS-n. The overhead processor 13 has an OH inserting (OH INS) section for inserting an SOB signal and a parity calculator for calculating a parity, which will be detailed later. The OH generator 14 generates the SOB signal.

The P/S convertor 15 parallel/serial-converts the low-speed parallel signal into the high-speed serial signal STS-n. The electric/optical convertor 16 converts the electric signal STS-n into an optical signal OC-n.

The optical terminal system still further includes a system clock generator 17, a monitoring controller 18, a power source 19, a high-level group loopback (LOOPBACK) section 20, a bit shifter 21, a low-level group loopback section 22, an array rearranging section 23, a self-loopback section 24, a self-monitoring controller 25, and a self-monitoring result indicator 26.

The system clock generator 17 generates a system clock for actuation of the receiver device and transmitter device. The monitoring controller 18 controls the system including the receiver device and transmitter device and monitors alarms by means of a microprocessor. The power source 19 supplies power to the entire system including the receiver device and transmitter device.

The high-level group loopback (LOOPBACK) section 20 allows for internal loopback of the high-speed signal STS-n. The bit shifter 21 is provided between the P/S convertor 15 and electric/optical convertor 16 for shifting the signal converted by the P/S convertor 15 by one bit to cause one-bit shift of the high-speed signal STS-n.

The low-level group loopback section 22 allows for internal loopback of the parallel signal STS-n. The array rearranging section 23 is provided between the OH processor 13 and P/S convertor 15 for replacing the parallel signal loaded with an over head by the OH processor 13 with a signal having another frame pattern.

The self-loopback section 24 connects the receiver device and transmitter device so that a signal output from the receiver device is sent to the transmitter device for loopback of the SPE signal.

The self-monitoring controller 25 controls a self-monitoring test to check the functions of the respective components (respective test blocks) of the receiver device and transmitter device by using the self-loopbacksection 24 and either of the high-level group loopback section 20 and low-level loopback section 22.

The self-monitoring result indicator 26 indicates a result of the self-monitoring test carried out by the self-monitoring controller 25 as well as test states including "test stand-by", "under testing", "test normal termination", "test abnormal termination" and the like by means of indicator lamps such as LEDs.

The self-monitoring test of the optical terminal system performed by the self-monitoring controller 25 is automatically started at the time of actuation of the power source. Alternatively, the self-monitoring test may be started at any given time by an instruction issued by the self-monitoring controller 18. When the check of the functions of the respective components of the receiver device and transmitter device is finished in a normal state, i.e., in case of normal termination of the self-monitoring test, the system returns to an ordinary state.

During the self-monitoring test of the optical terminal system performed by the self-monitoring controller 25, the output of an optical signal from the electric/optical convertor 16 is stopped, thereby ensuring the safety of a maintenance engineer against a laser beam.

Figure 2:
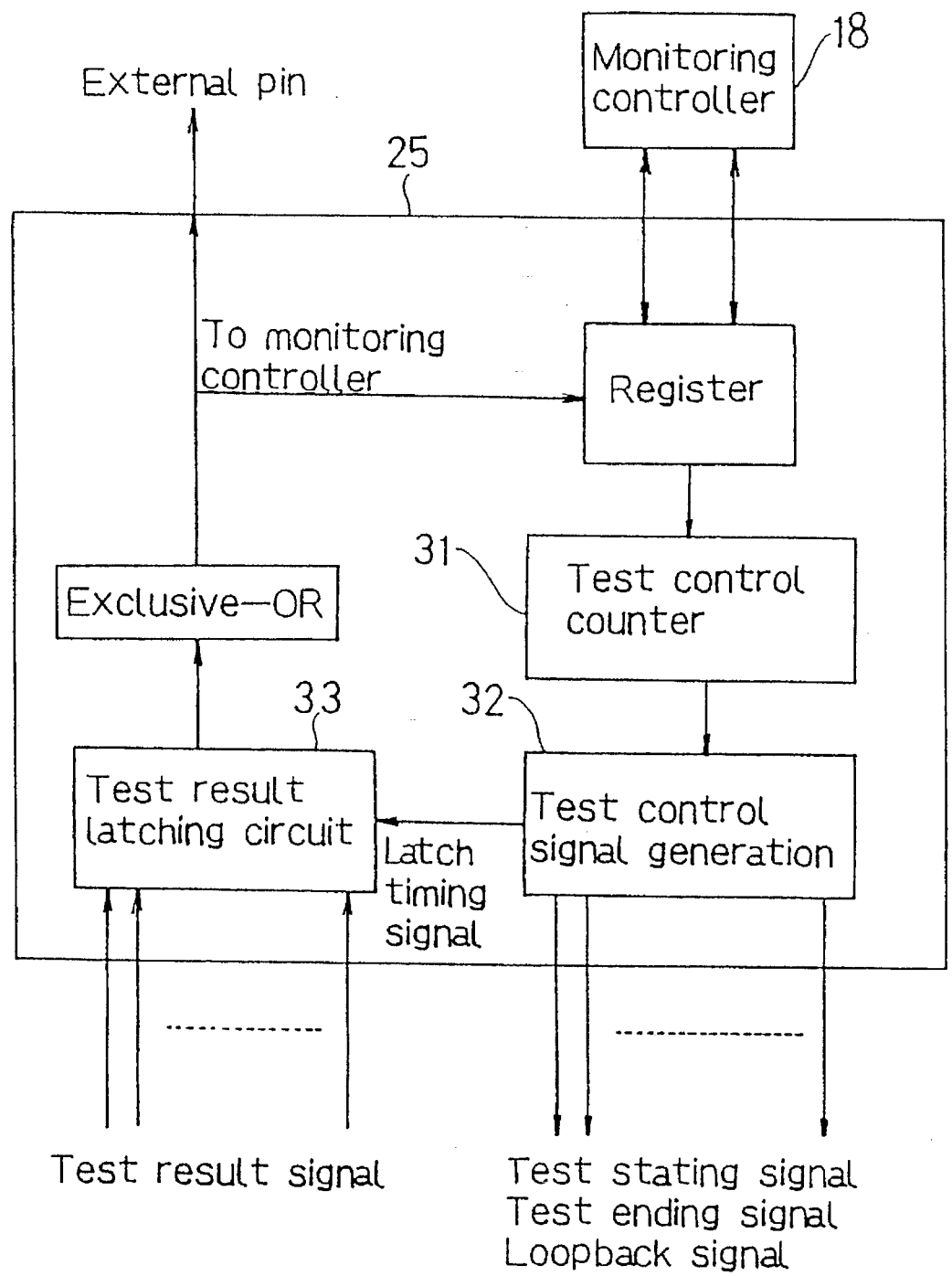
FIG. 2 is a block diagram illustrating a structure of a self-monitoring controller.

FIG. 2 is a block diagram illustrating a structure of the self-monitoring controller 25. As shown, the self-monitoring controller 25 includes a test control counter 31, a test control signal generator 32 and a test result latching circuit 33.

The test control counter 31 measures a testing period during which each of the components from a high-level group to a low-level group is tested.

The test control signal generator 32 sends test control signals, i.e., a test starting signal and test ending signal, to each of the test blocks (first high-level group and then the low-level group) based on a value of the test control counter 31 and generates a loopback control signal during a functional test that requires loopback.

The test result latching circuit 33 latches a test result with a latch timing signal sent from the test control counter 31 during the test of each of the test blocks.

As described above, the test control signal generator 32 in the self-monitoring controller 25 outputs a test starting signal to a test block (first in the high-level group) immediately after power-on or by the instruction issued by the monitoring controller 18 at any given time, and outputs thereto a test ending signal after a time period T1. At this time, if the test block includes a plurality of sub-blocks, a loopback signal is continuously output to the test block for the time period T1.

The test result is latched by the test result latching circuit 33 with the latch timing signal sent from the test control signal generator 32. Then, the test starting signal and test ending signal are output to the next test block. This process is repeated to test the respective test blocks.

After test results are all exclusive-ORed by the test result latching circuit 33, the final test result is sent via an external pin or the monitoring controller 18 to the exterior. Thus, the functional tests are individually carried out to check the functions of the respective components (first in the high-level group) and, therefore, efficient functional tests can be realized.

Figure 3:
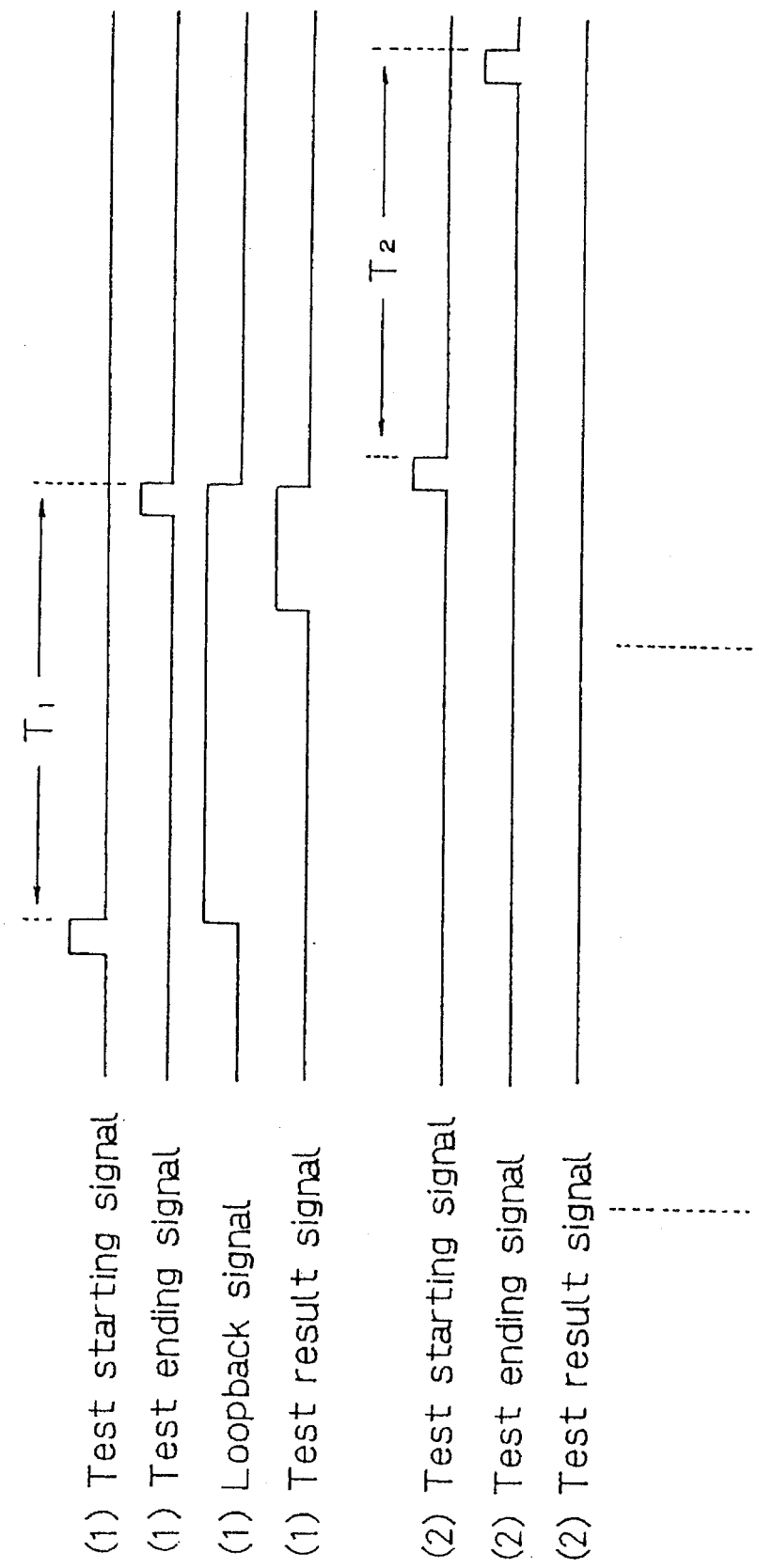
FIG. 3 is a timing chart illustrating the timing of test control signals output from a test controlling signal generator.

FIG. 3 is a timing chart illustrating the timing of test control signals output from the test controlling signal generator 32. As shown, the test control signal generator 32 in the self-monitoring controller 25 first outputs a test starting signal to a test block and then a test ending signal after the time period T1. If the test block includes a plurality of sub-blocks, the test control signal generator 32 outputs a loopback signal to the test block for the time period T1. Then, the test result is latched in the test result latching circuit 33. Thereafter, a test starting signal and test ending signal are sent to the next test block, and this process is repeated.

Figure 4:
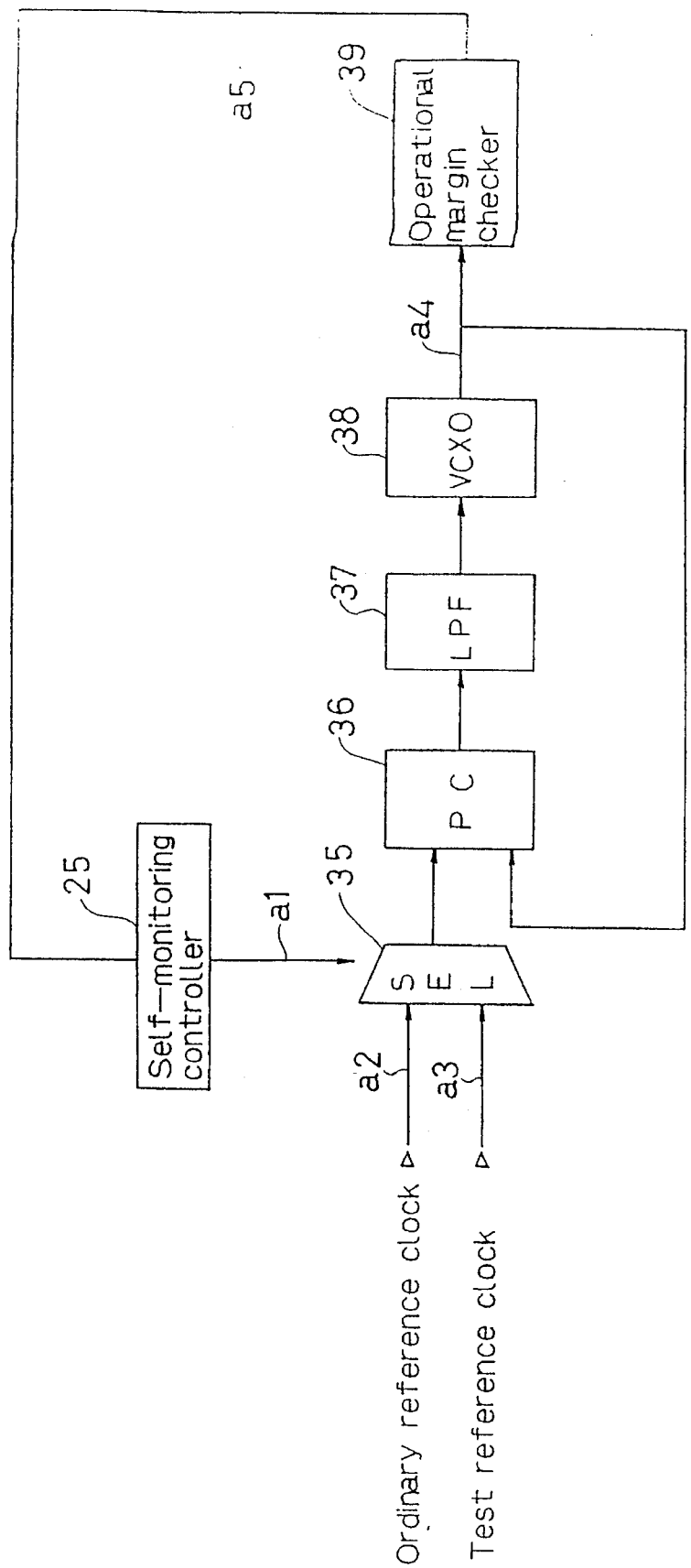
FIG. 4 is a block diagram illustrating a circuit for checking an internal operational margin for clock frequency by increasing the frequency of a master clock.

FIG. 4 is a block diagram illustrating a circuit for checking an internal operational margin of the system for clock frequency by increasing the frequency of a master clock. During the self-monitoring test performed by the self-monitoring controller 25, the internal operational margin for clock frequency is checked by increasing the frequency of master clock generated by the system clock generator 17.

As shown, a selector (SEL) 35 switches a c lock from an ordinary reference clock a2 to a test reference clock a3 upon, receiving a test starting signal a1 output from the self-monitoring controller 25. The frequency of the test reference clock a3 is set to about 10% to 20% greater than that of the ordinary reference clock.

The test reference clock a3 is input to a phase comparator (PC) 36. The phase comparator 36 compares a preadjustment master clock with the test reference clock a3. The frequency of a master clock a4 generated by a voltage control crystal oscillator (VCXO) 38 is adjusted via a low-pass filter (LPF) 37.

By employing the adjusted master clock a4 having a higher frequency, the operational margin for clock frequency is checked by an operational margin checker 39. If an abnormal test result is obtained, the operational margin checker 39 judges that the operational margin is insufficient, and then sends a judgment signal a5 indicative of this result to the self-monitoring controller 25. If a normal test result is obtained, the operational margin checker 39 judges that the operational margin is sufficient, and then sends a judgment signal a5 indicative of this result to the self-monitoring controller 25.

Thus, the operational margin of the system for clock frequency is checked by increasing the frequency of the master clock during the self-monitoring test.

Figure 5:
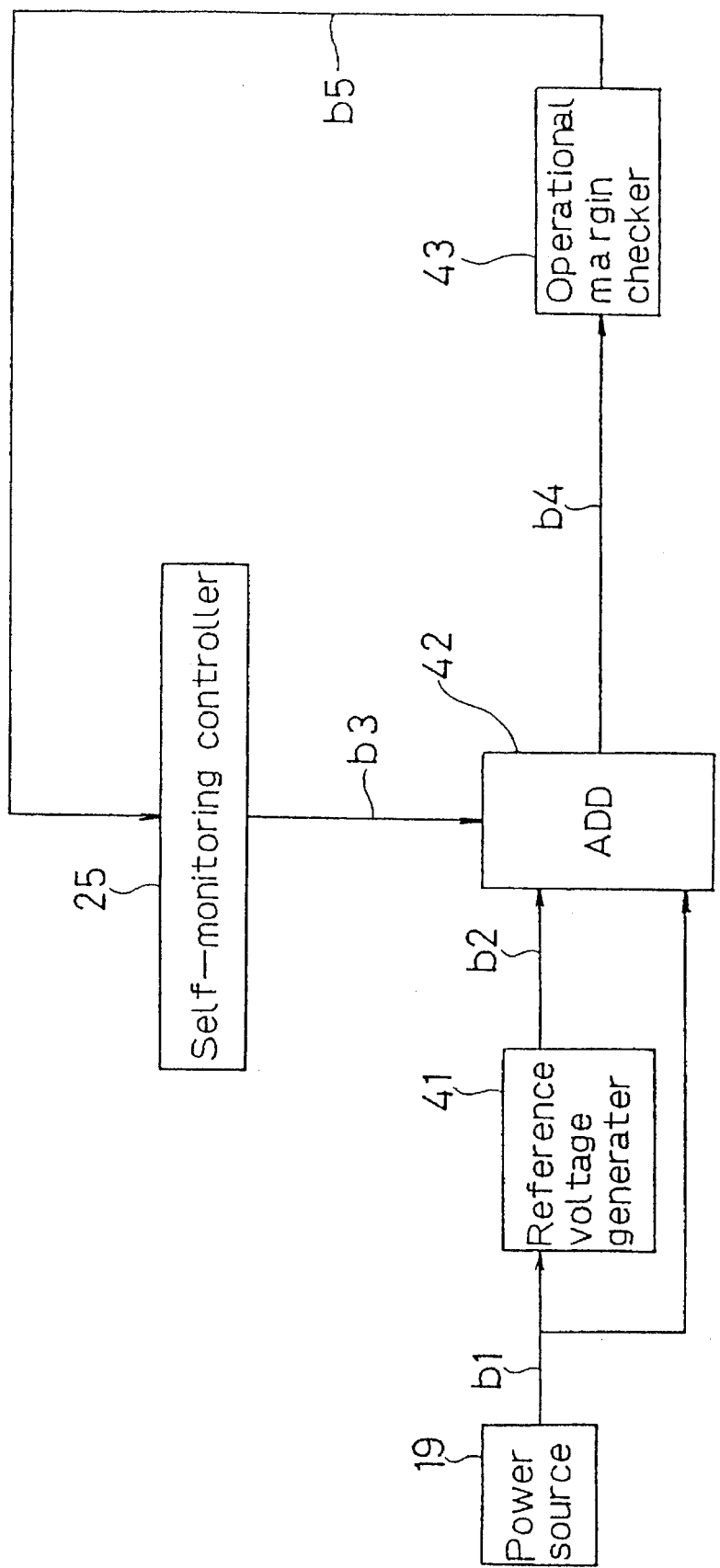
FIG. 5 is a block diagram illustrating a circuit for checking an internal operational margin for power supply by changing a power supply voltage.

FIG. 5 is a block diagram illustrating a circuit for checking an internal operational margin of the system for power supply by changing the power supply voltage. The operational margin for power supply is checked by setting the power source voltage of the power source 19 higher or lower than that in an ordinary state during the self-monitoring test performed by the self-monitoring controller 25.

As shown, an ordinary voltage b1 output from the power source 19 is input to a voltage generator 41 and adder (ADD) 42. A reference voltage generator 41 generates a reference voltage b2 from the ordinary voltage b1 input from the power source 19, and then inputs the reference voltage b2 to the ADD 42. When receiving a test starting signal b3 from the self-monitoring controller 25, the ADD 42 adds the reference voltage b2 to the ordinary voltage b1 to generate a variable voltage b4. The variable voltage b4 input to the operational margin checker 43 is used to check if the operational margin is normal. If an abnormal test result is obtained, the operational margin checker 43 judges that the operational margin is insufficient and then sends a judgment signal b5 indicative of this result to the self-monitoring controller 25. If a normal test result is obtained, the operational margin checker 39 judges that the operational margin is sufficient and then sends a judgment signal a5 indicative of this result to the self-monitoring controller 25.

Thus, the operational margin of the system for power supply is checked by changing the power supply voltage during the self-monitoring test.

Figure 6:
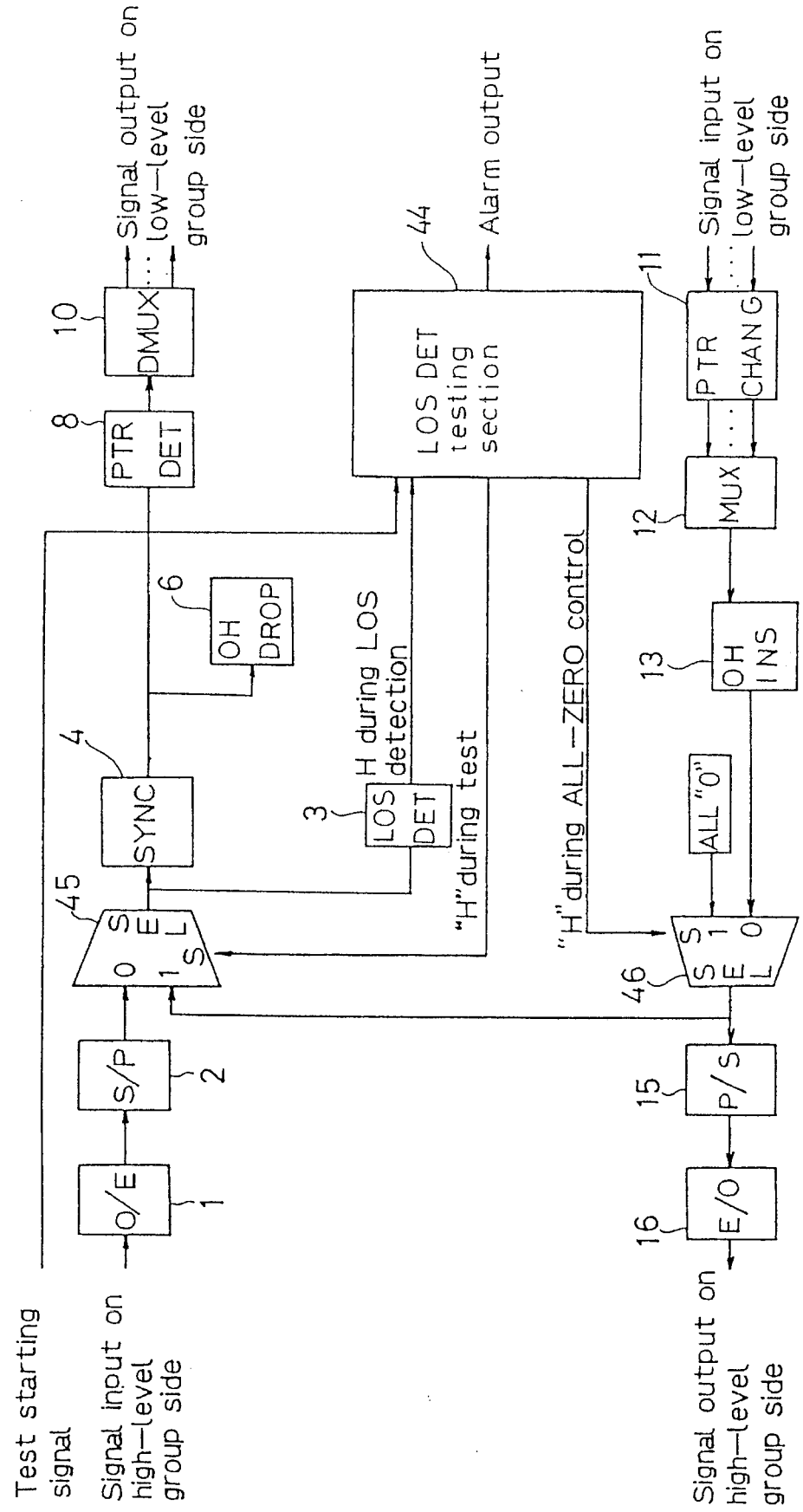
FIG. 6 is a block diagram illustrating a circuit for testing a loss-of-signal detector (LOS DET)
Figure 7:
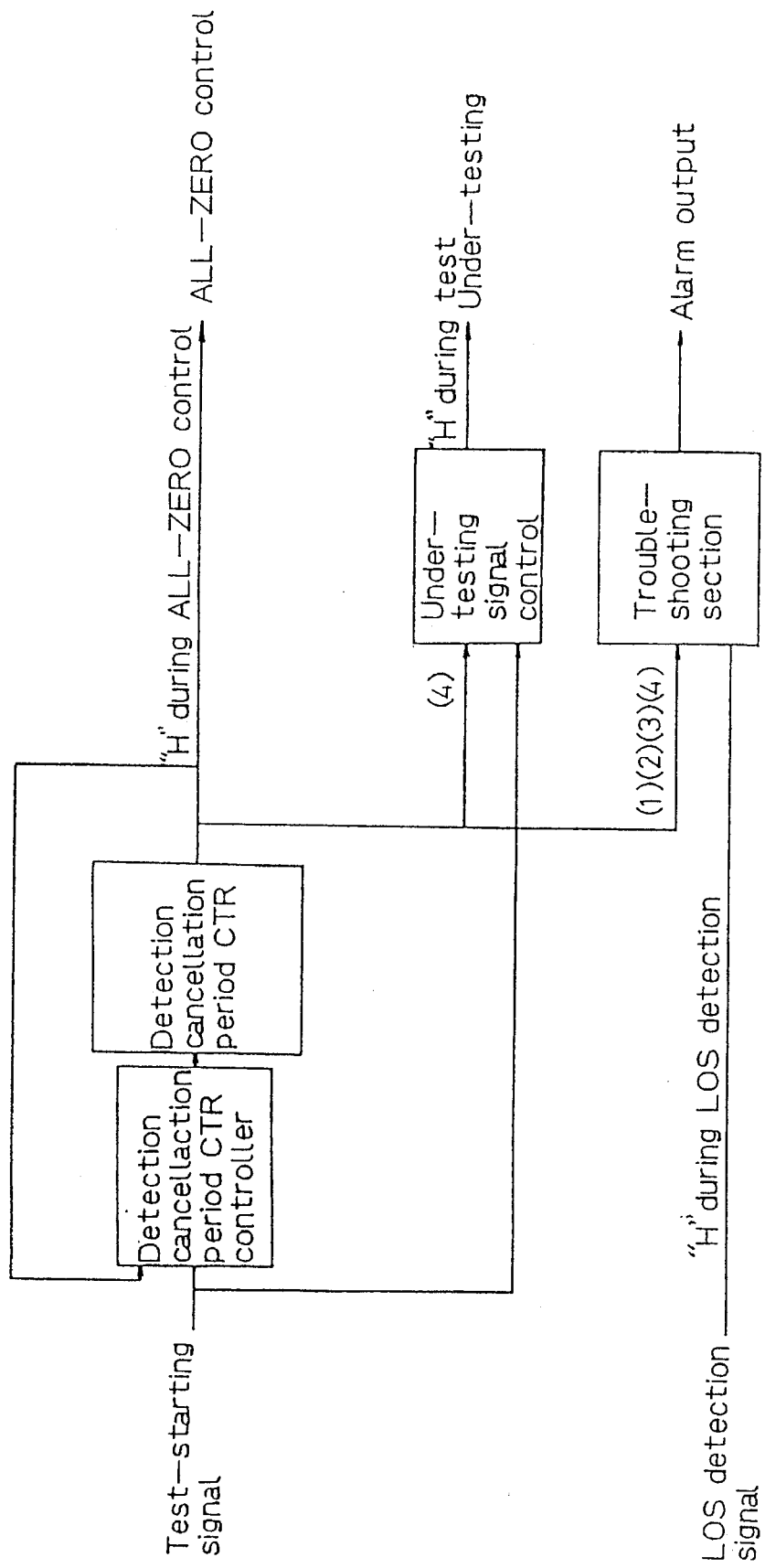
FIG. 7 is a functional block diagram for explaining a function of a LOS DET testing section.

FIG. 6 is a block diagram illustrating a circuit for testing the loss-of-signal detector (LOS DET) 3. As shown, the circuit has an LOS DET testing section 44 and selectors (SELs) 45 and 46. FIG. 7 is a functional block diagram for explaining a function of the LOS DET testing section 44, and FIG. 8 is a timing chart illustrating the timing of test control signals of the LOS DET testing section 44.

As shown, in response to a test starting signal input to the LOS DET testing section 44 from the self-monitoring controller 25, the LOS DET testing section 44 outputs an under-testing signal and enables a side 1 of the SEL 45. At the same time, the LOS DET testing section 44 enables a side 1 of the SEL 46 to start an ALL-ZERO signal output control.

Figure 8:
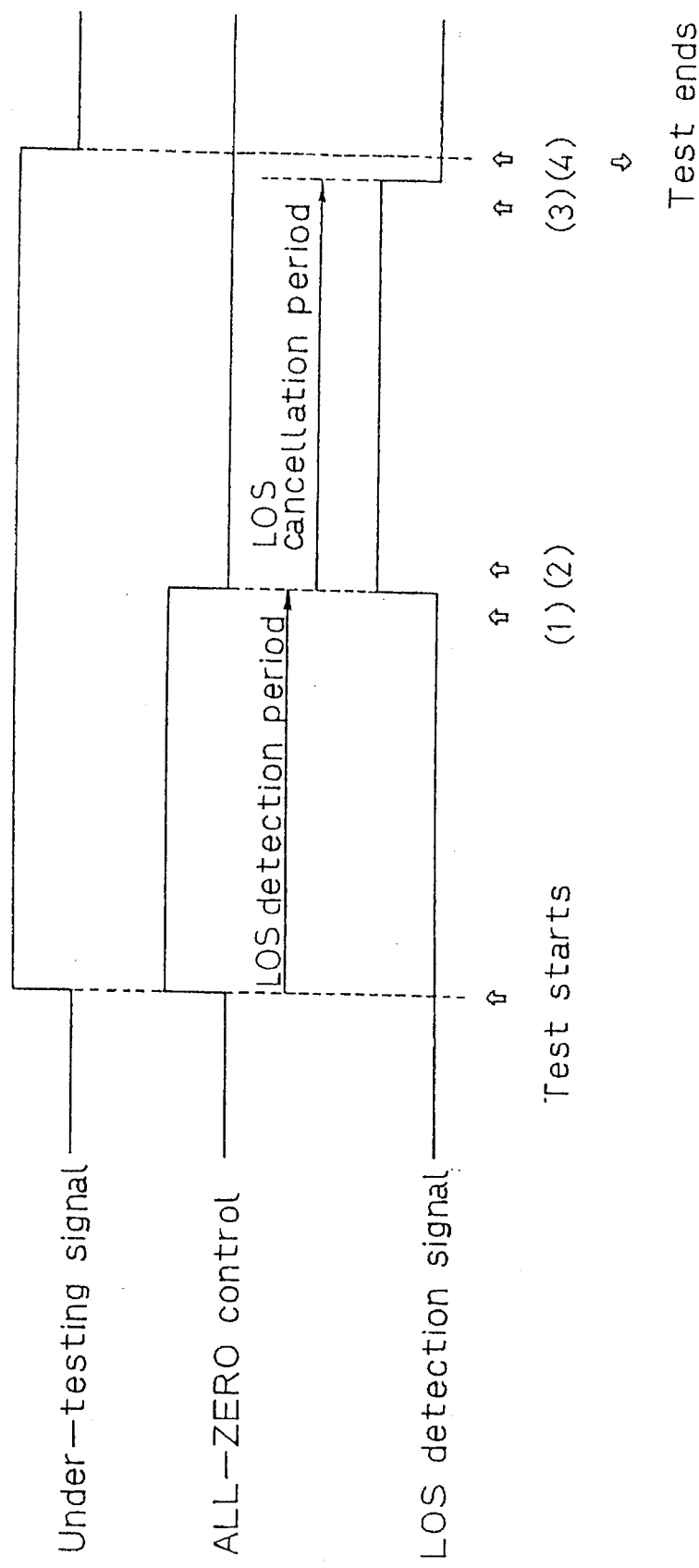
FIG. 8 is a timing chart illustrating the timing of test control signals of the LOS DET testing section.

If an LOS detection signal is output at the time indicated by the arrow (1) in FIG. 8 just before an LOS detection period ends, the LOS DET testing section 44 outputs an alarm, and if not, the LOS DET testing section 44 does not output the alarm. Further, if the LOS detection signal is not output at the time indicated by the arrow (2) just after the ALL-ZERO signal output control is terminated during the LOS detection, an alarm is output, and if the LOS detection signal is output, the alarm is not output. Still further, if the LOS detection signal is not output at the time indicated by the arrow (3) just before an LOS detection cancellation period ends after the ALL-ZERO control is terminated, an alarm is output, and if the LOS detection signal is output, the alarm is not output. Yet further, if the LOS detection signal is output at the time indicated by the arrow (4) after the LOS cancellation period ends, an alarm is output, and if not, the alarm is not output. The LOS DET test is completed at the time indicated by the arrow (4).

Thus, the LOS DET (LOS alarm detector) is tested by performing the ALL-ZERO signal output control on the transmitter side for a predetermined time period.

Figure 9:
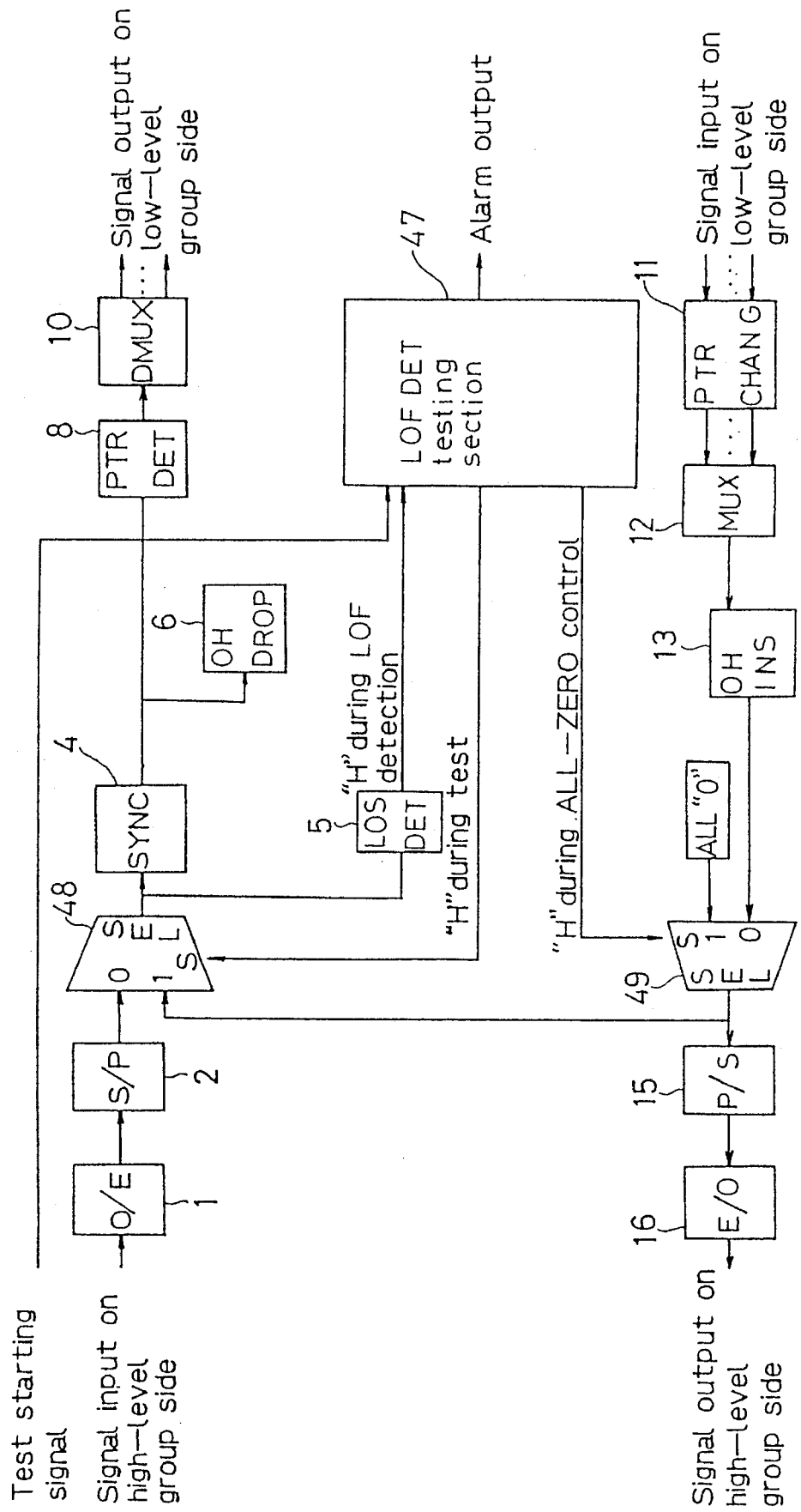
FIG. 9 is a block diagram illustrating a circuit for testing a loss-of-frame alarm detector (LOF DET)
Figure 10:
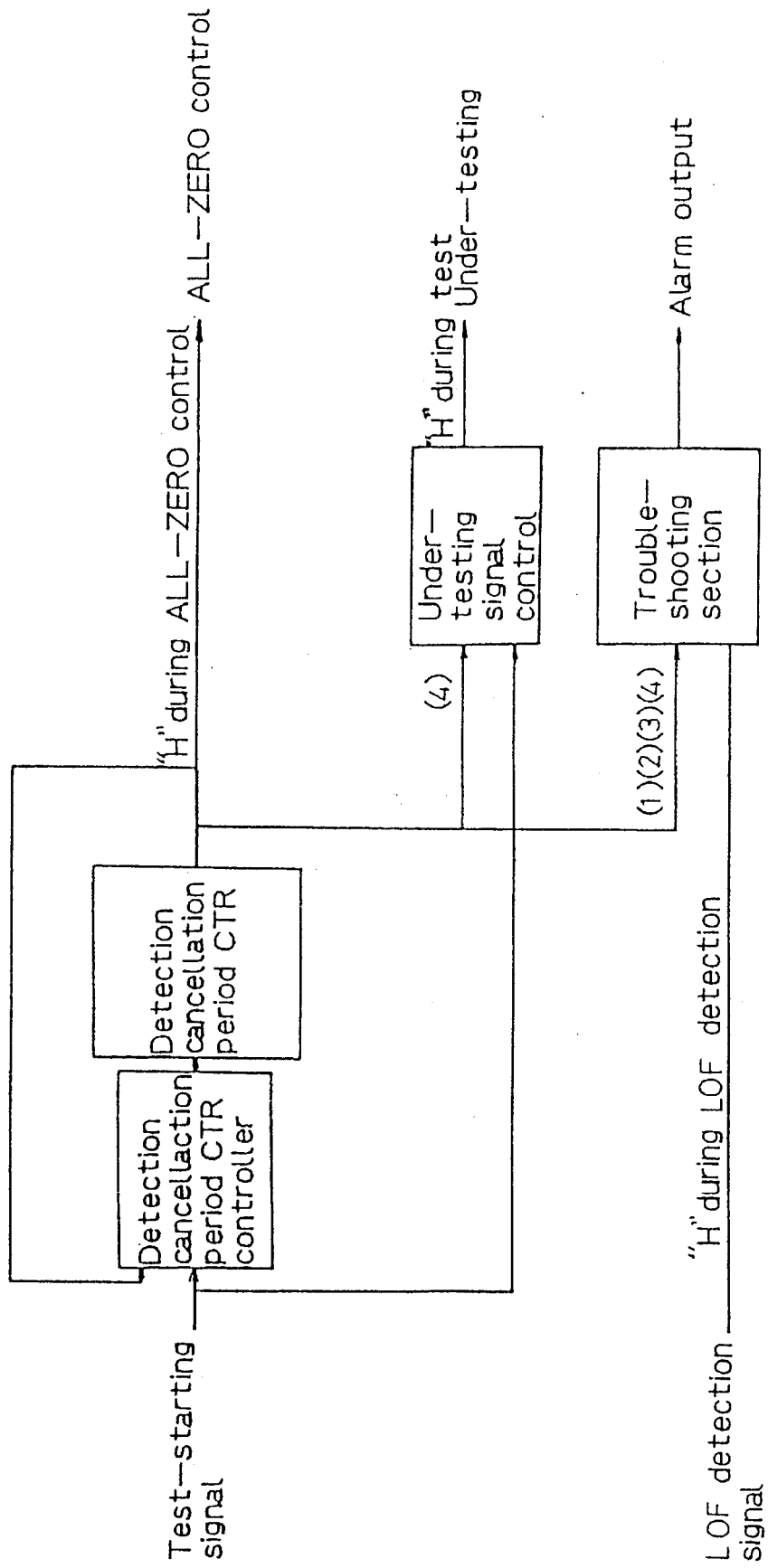
FIG. 10 is a functional block diagram for explaining a function of the LOF DET testing section.
Figure 11:
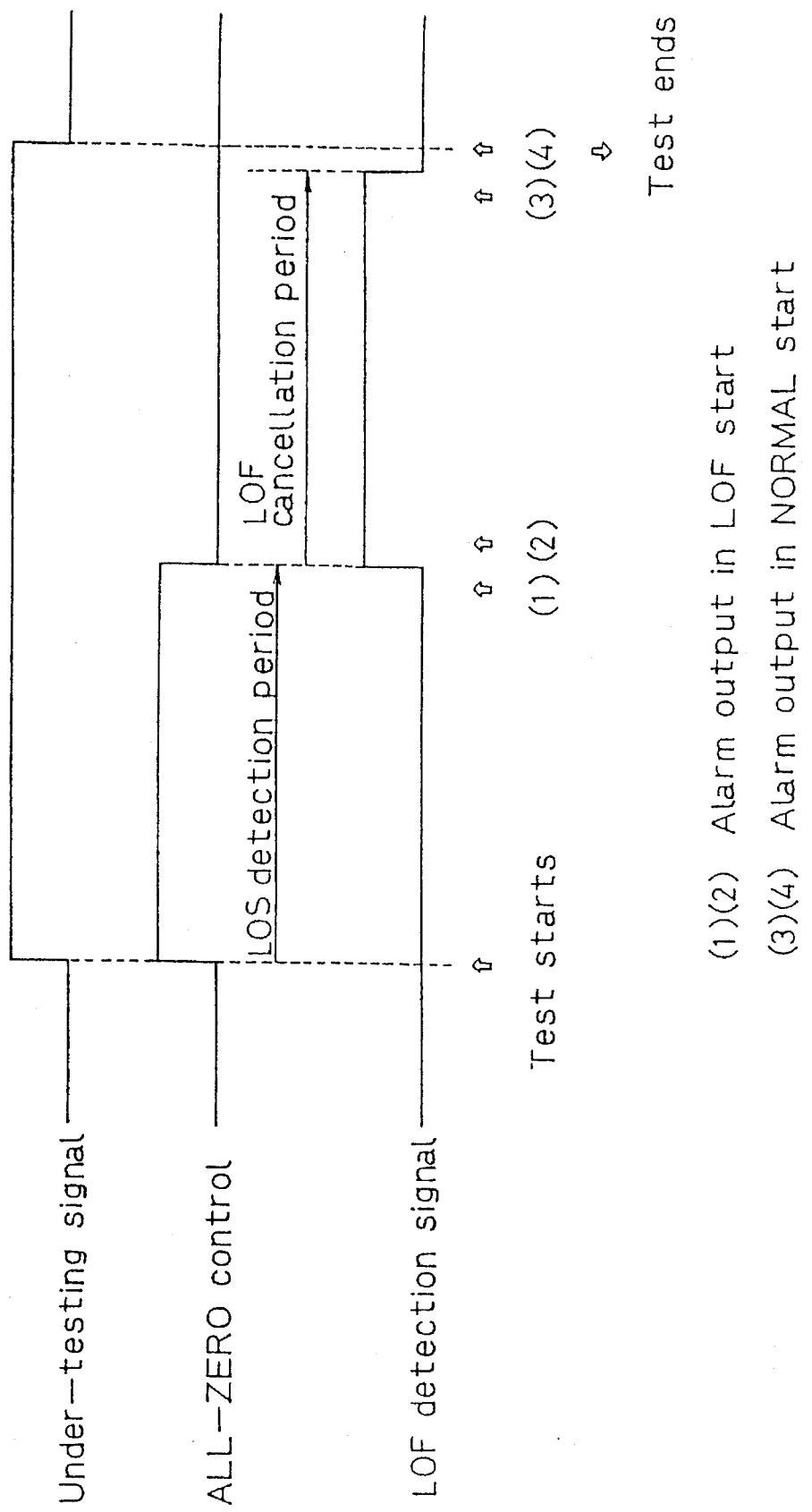
FIG. 11 is a timing chart illustrating the timing of signals of the LOF DET testing section.

FIG. 9 is a block diagram illustrating a circuit for testing a loss-of-frame alarm detector (LOF DET) 5. As shown, the circuit has an LOF DET testing section 47 and selectors (SELs) 48 and 49. FIG. 10 is a functional block diagram for explaining a function of the LOF DET testing section 47. FIG. 11 is a timing chart illustrating the timing of signals of the LOF DET testing section 47.

As shown, in response to a test starting signal input to the LOF DET testing section 47 from the self-monitoring controller 25, the LOF DET testing section 47 outputs an under-testing signal and enables a side 1 of the SEL 48. At the same time, the LOF DET testing section 47 enables a side 1 of the SEL 49 to start an ALL-ZERO signal output control.

If an LOF detection signal is output at the time indicated by the arrow (1) in FIG. 11 just before an LOF detection period ends, the LOF DET testing section 47 outputs an alarm, and if not, the LOF DET testing section 47 does not output the alarm. Further, if the LOF detection signal is not output at the time indicated by the arrow (2) just after the ALL-ZERO signal output control is terminated during the LOF detection, an alarm is output, and if the LOF detection signal is output, the alarm is not output. Still further, if the LOF detection signal is not output at the time indicated by the arrow (3) just before an LOF cancellation period ends after the ALL-ZERO control is terminated, an alarm is output, and if the LOF detection signal is output, the alarm is not output. Yet further, if the LOF detection signal is output at the time indicated by the arrow (4) after the LOF cancellation period ends, an alarm is output, and if not, the alarm is not output. The LOF DET test is completed at the time indicated by the arrow (4).

Thus, the LOF DET (LOF alarm detector) is tested by interrupting frame pattern generation on the transmitter side for a predetermined time period.

Figure 12:
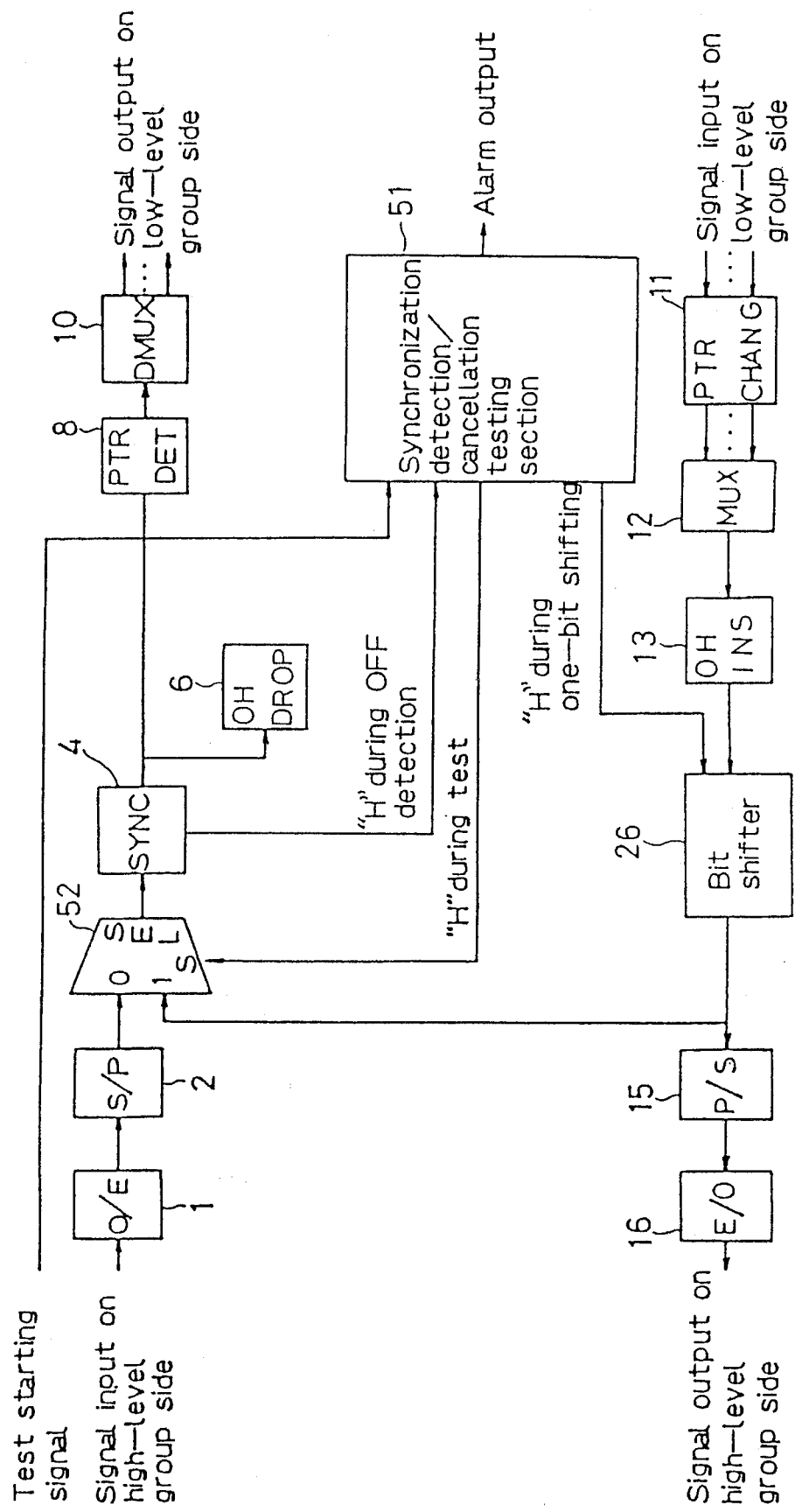
FIG. 12 is a block diagram illustrating a circuit for testing a synchronization detection and cancellation.
Figure 13:
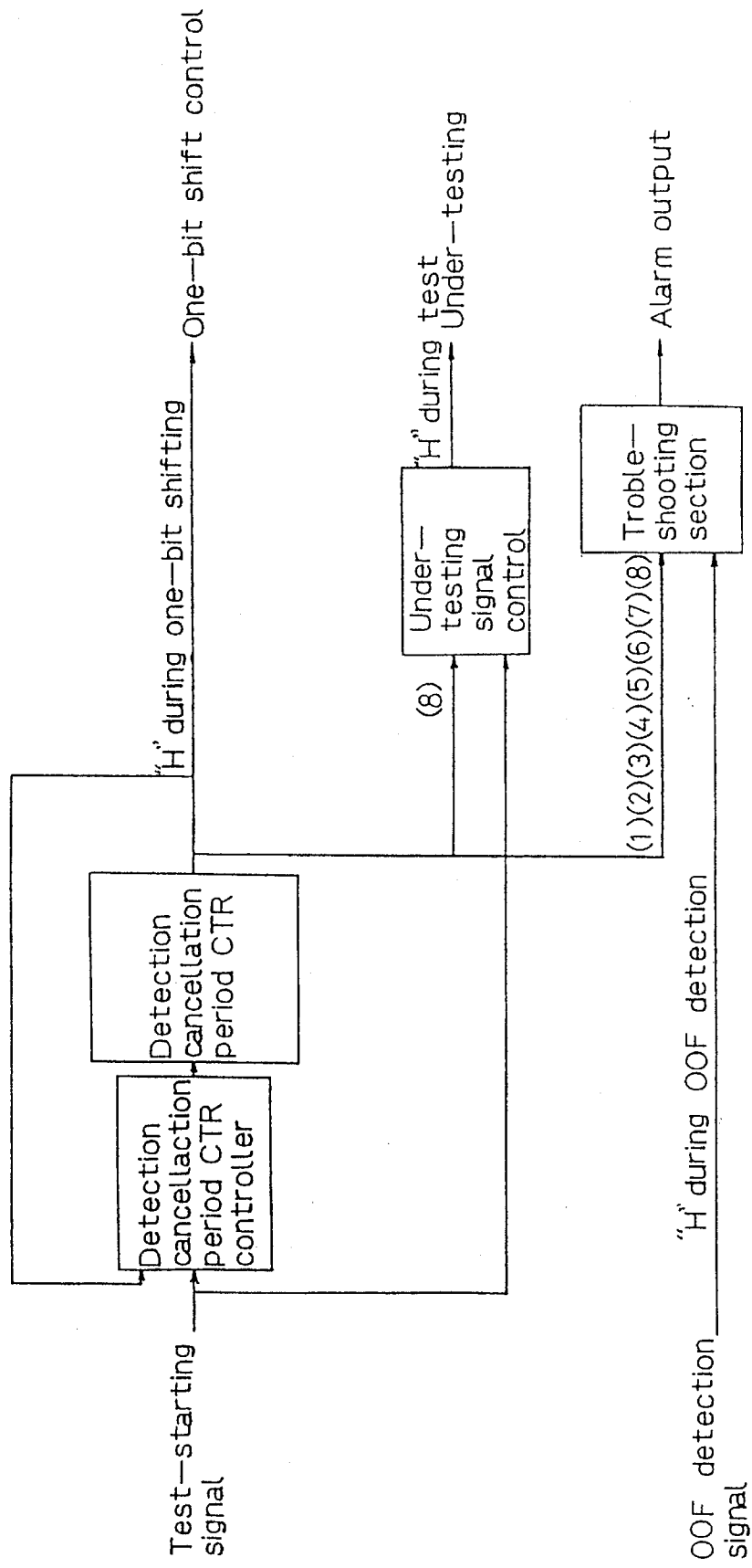
FIG. 13 is a functional block diagram for explaining a function of synchronization detection/cancellation testing section.
Figure 14:
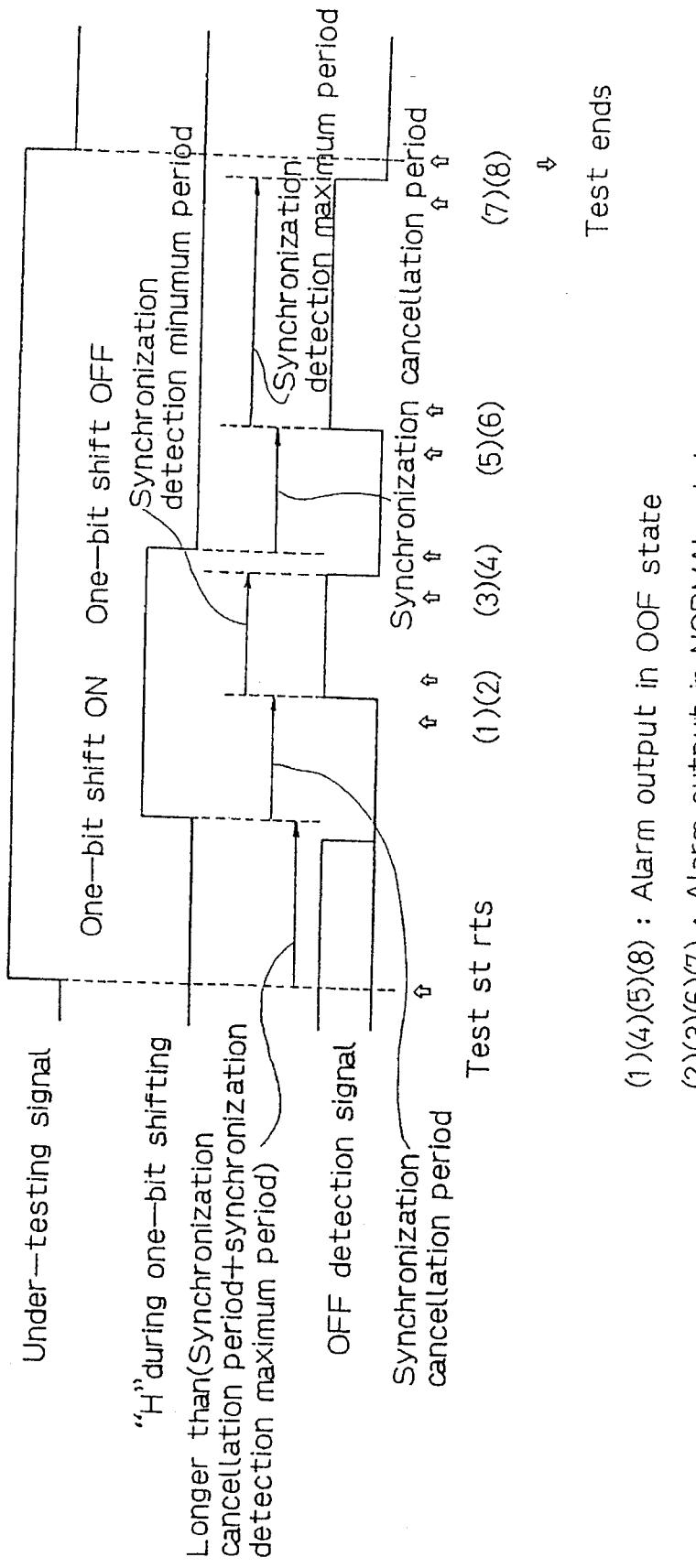
FIG. 14 is a timing chart illustrating the timing of signals of the synchronization detection/cancellation testing section.

FIG. 12 is a block diagram illustrating a circuit for testing a synchronization detection and cancellation. The circuit has a synchronization detection/cancellation testing section 51 and selector (SEL) 52. FIG. 13 is a functional block diagram for explaining a function of synchronization detection/cancellation testing section 51. FIG. 14 is a timing chart illustrating the timing of signals of the synchronization detection/cancellation testing section 51.

As shown, in response to a test starting signal input to the synchronization detection/cancellation testing section 51 from the self-monitoring controller 25, the synchronization detection/cancellation testing section 51 outputs an undertesting signal and enables a side 1 of the SEL 52. When an out-of-frame (OOF) detection signal is in a synchronization state (or low level "L") after a time period equivalent to a synchronization cancellation period plus synchronization detection maximum period elapses, the synchronization detection/cancellation testing section 51 applies a high-level (H) signal to a bit shifter 26 to start a one-bit shifting control on an output signal.

If the OOF detection signal is output at the time indicated by the arrow (1) in FIG. 14 just before a synchronization cancellation period starts, the synchronization detection/cancellation testing section 51 outputs an alarm, and if not, the synchronization detection/cancellation testing section 51 does not output the alarm. Further, if the OOF detection signal is not output at the time indicated by the arrow (2) just after the synchronization cancellation period ends, an alarm is output, and if the OOF detection signal is output, the alarm is not output. Still further, if the OOF detection signal is not output at the time indicated by the arrow (3) just before a synchronization detection minimum period ends, an alarm is output, and if the OOF detection signal is output, the alarm is not output. Yet further, if the OOF detection signal is output at the time indicated by the arrow (4) just after the synchronization detection maximum period ends, an alarm is output, and if not, the alarm is not output.

At the time indicated by the arrow (4), the synchronization detection/cancellation testing section 51 terminates the one-bit shifting control. If the OOF detection signal is output at the time indicated by the arrow (5) just before the synchronization cancellation period ends, an alarm is output, and if not, the alarm is not output. Further, if the OOF detection signal is output at the time indicated by the arrow (6) just after the synchronization cancellation period ends, an alarm is output, and if not, the alarm is not output. Still further, if the OOF detection signal is not output at the time indicated by the arrow (7) just before the synchronization detection maximum period ends, an alarm is output, and if the OOF detection signal is output, the alarm is not output. Yet further, if the OOF detection signal is output at the time indicated by the arrow (8) just after the synchronization detection maximum period ends, an alarm is output, and if not, the alarm is not output. The synchronization detection/cancellation test is completed at the time indicated by the arrow (8).

Thus, the synchronization detection/cancellation test is carried out by means of the bit shifter 26 on the transmitter side.

Figure 15:
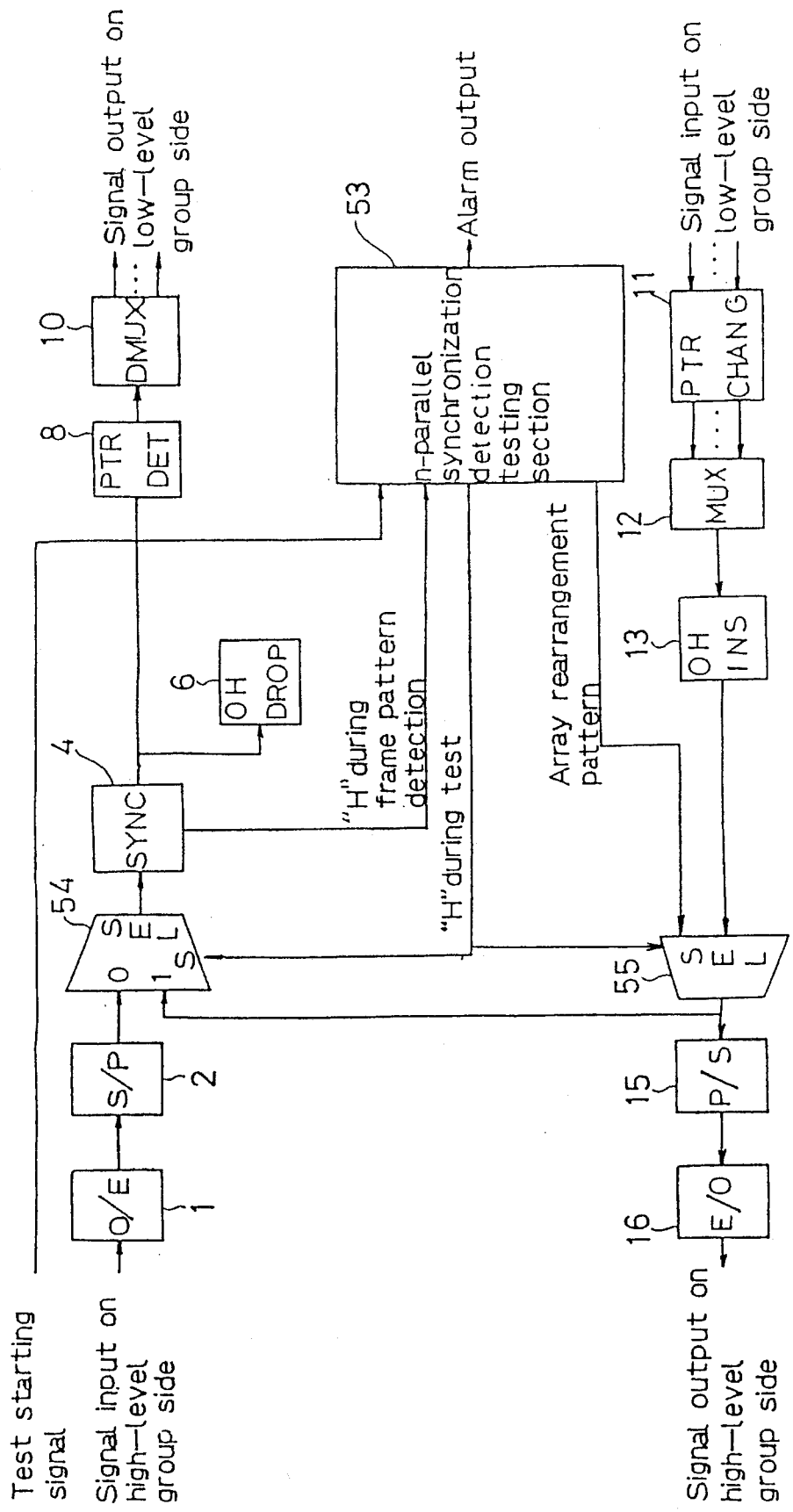
FIG. 15 is a block diagram illustrating a circuit for testing an n-parallel synchronization detector.
Figure 16:
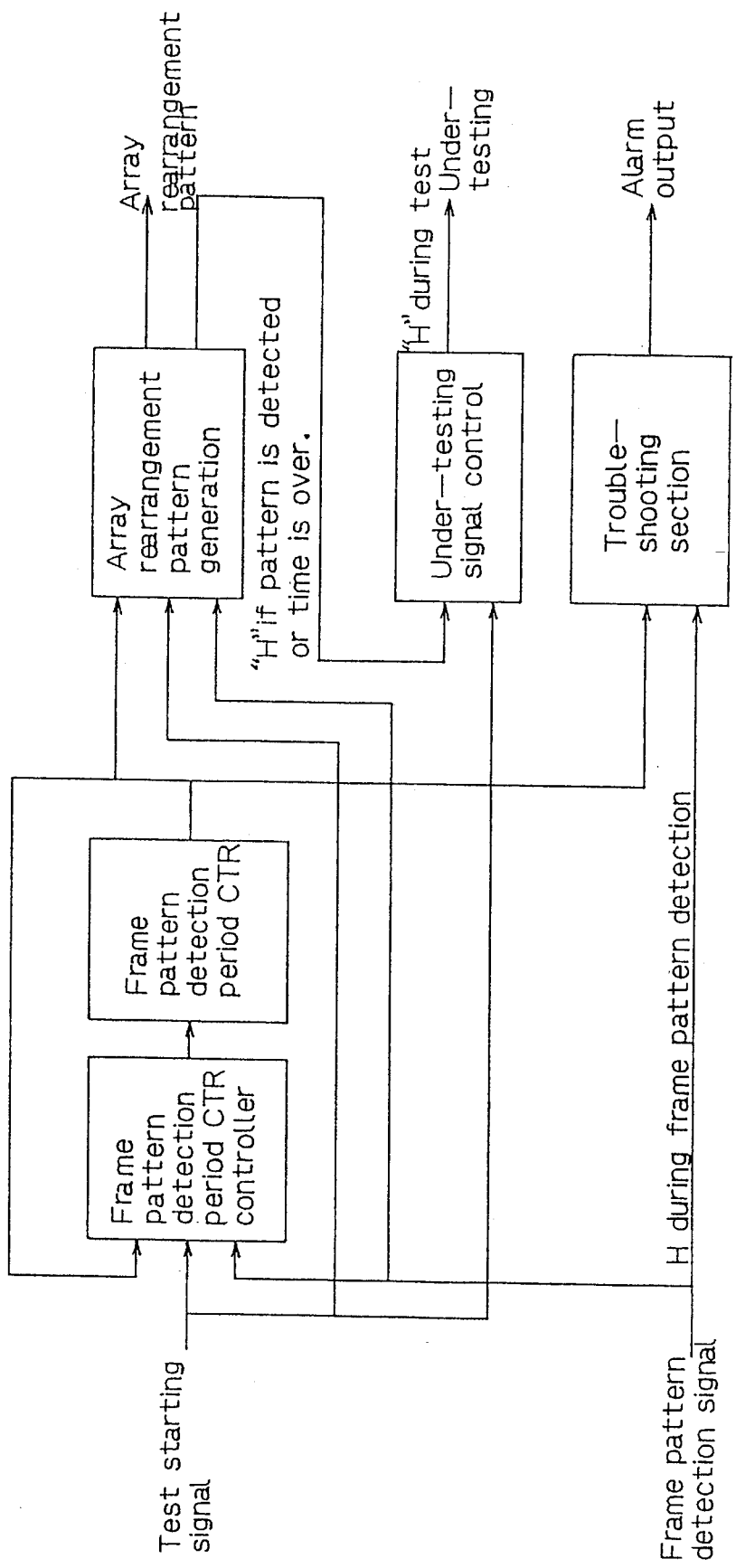
FIG. 16 is a functional block diagram for explaining a function of the n-parallel synchronization detection testing section.
Figure 17:
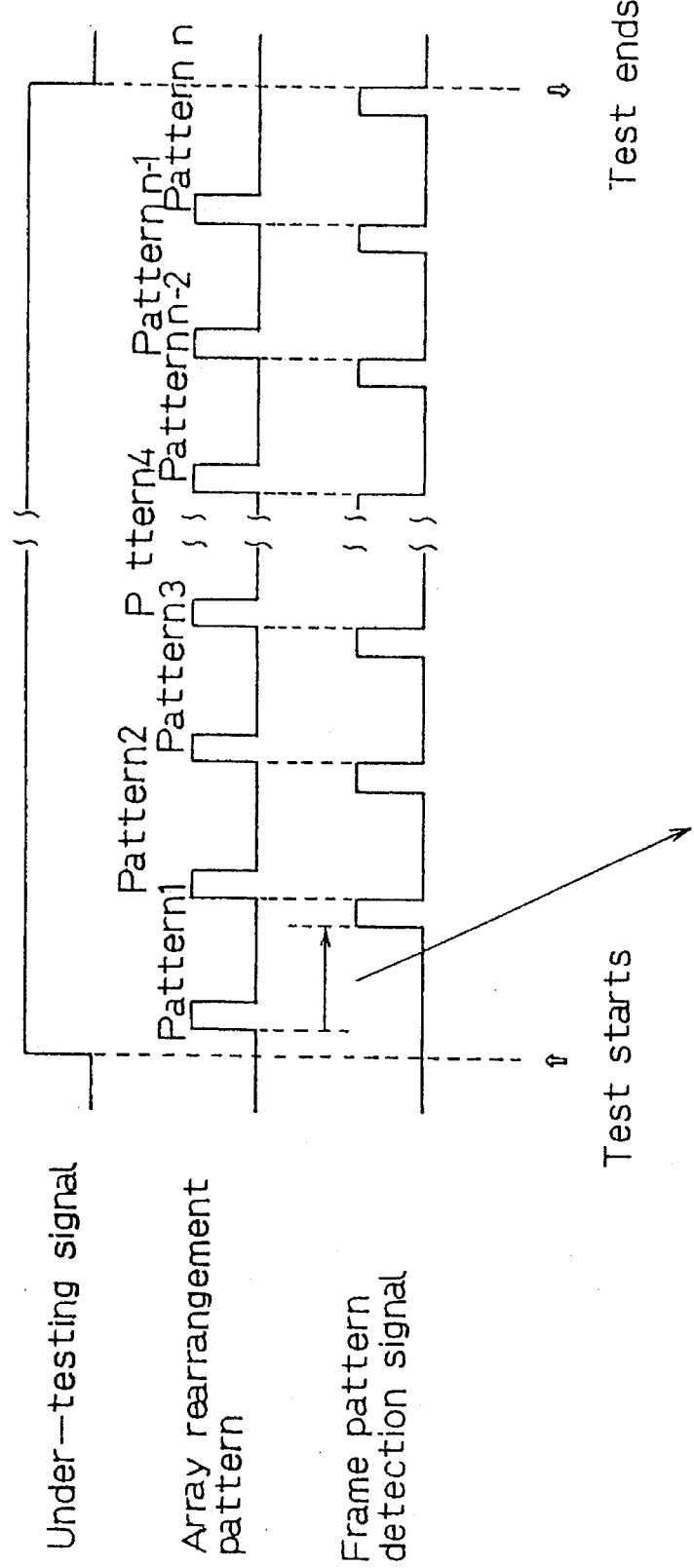
FIG. 17 is a timing chart illustrating the timing of signals of the n-parallel synchronization detection testing section.

FIG. 15 is a block diagram illustrating a circuit for testing an n-parallel synchronization detector (SYNC) 41. The circuit has an n-parallel synchronization detection testing section 53 and selectors (SELs) 54 and 55. FIG. 16 is a functional block diagram for explaining a function of the nparallel synchronization detection testing section 53. FIG. 17 is a timing chart illustrating the timing of signals of the n-parallel synchronization detection testing section 53.

As shown, in response to a test starting signal input to the n-parallel synchronization detection testing section 53 from the self-monitoring controller 25, the n-parallel synchronization detection testing section 53 outputs an undertesting signal and enables sides 1 of the SELs 54 and 55. At the same time, the n-parallel synchronization detection testing section 53 allows the array rearranging section 23 to output a first pattern as an array rearrangement pattern. If a frame pattern detection signal is not input within a predetermined time period, the n-parallel synchronization detection testing section 53 outputs an alarm, and the test ends. On the other hand, if the frame pattern detection signal is input, the n-parallel synchronization detection testing section 53 allows the array rearranging section 23 to output a second pattern.

The n-parallel synchronization detection testing section 53 repeats the aforesaid process, and when a frame pattern detection signal is input in response to an n-th pattern output by the array rearranging section 23, the test is completed.

Thus, the function of the frame pattern detection performed by the n-parallel synchronization detector 41 is tested by way of the array rearrangement by the array rearranging section 23 on the transmitter side.

Figure 18:
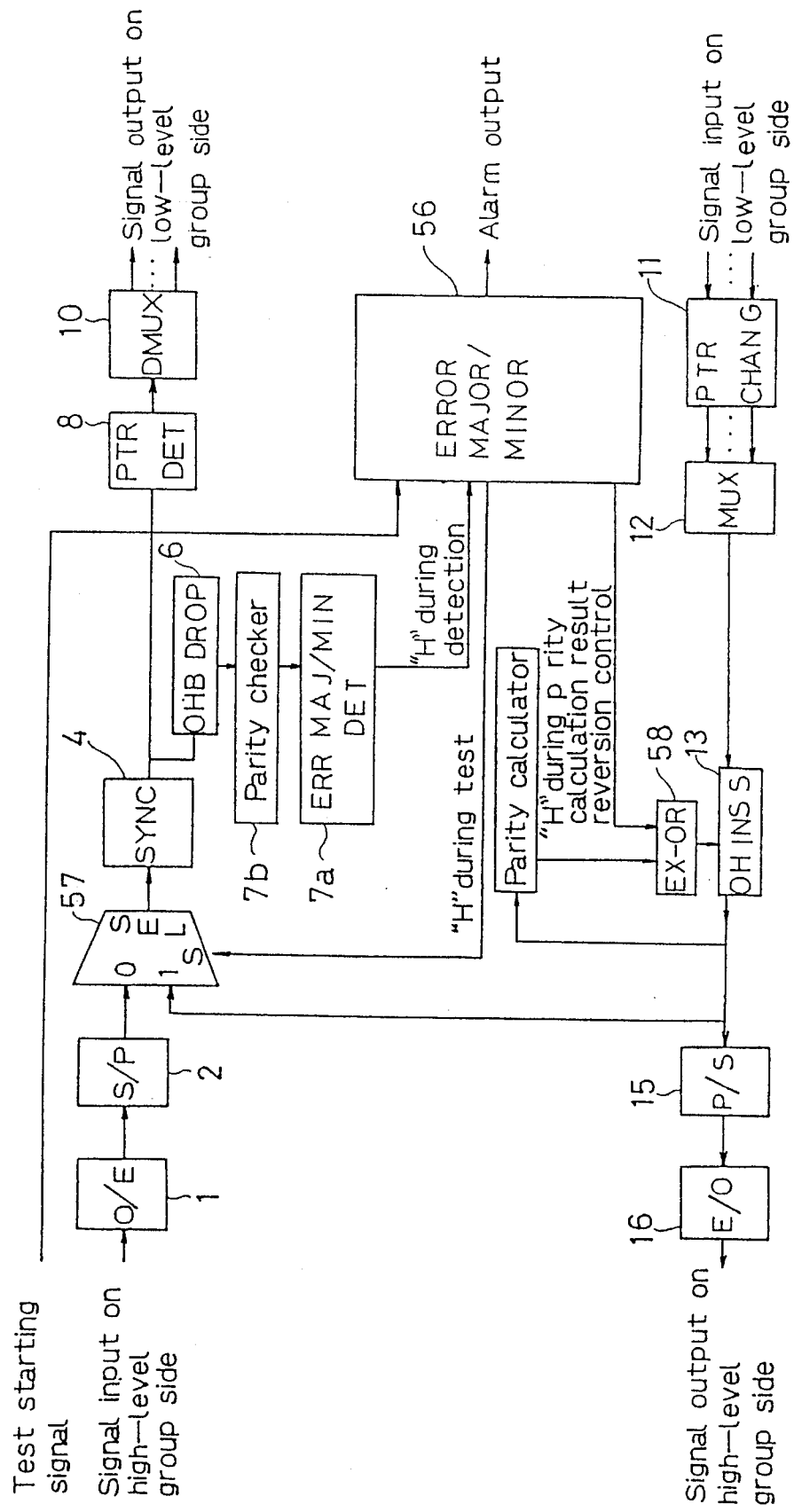
FIG. 18 is a block diagram illustrating a circuit for testing an error major/minor detector (ERR MAJ/MIN DET) for detection of bit error rate of a transmission line.
Figure 19:
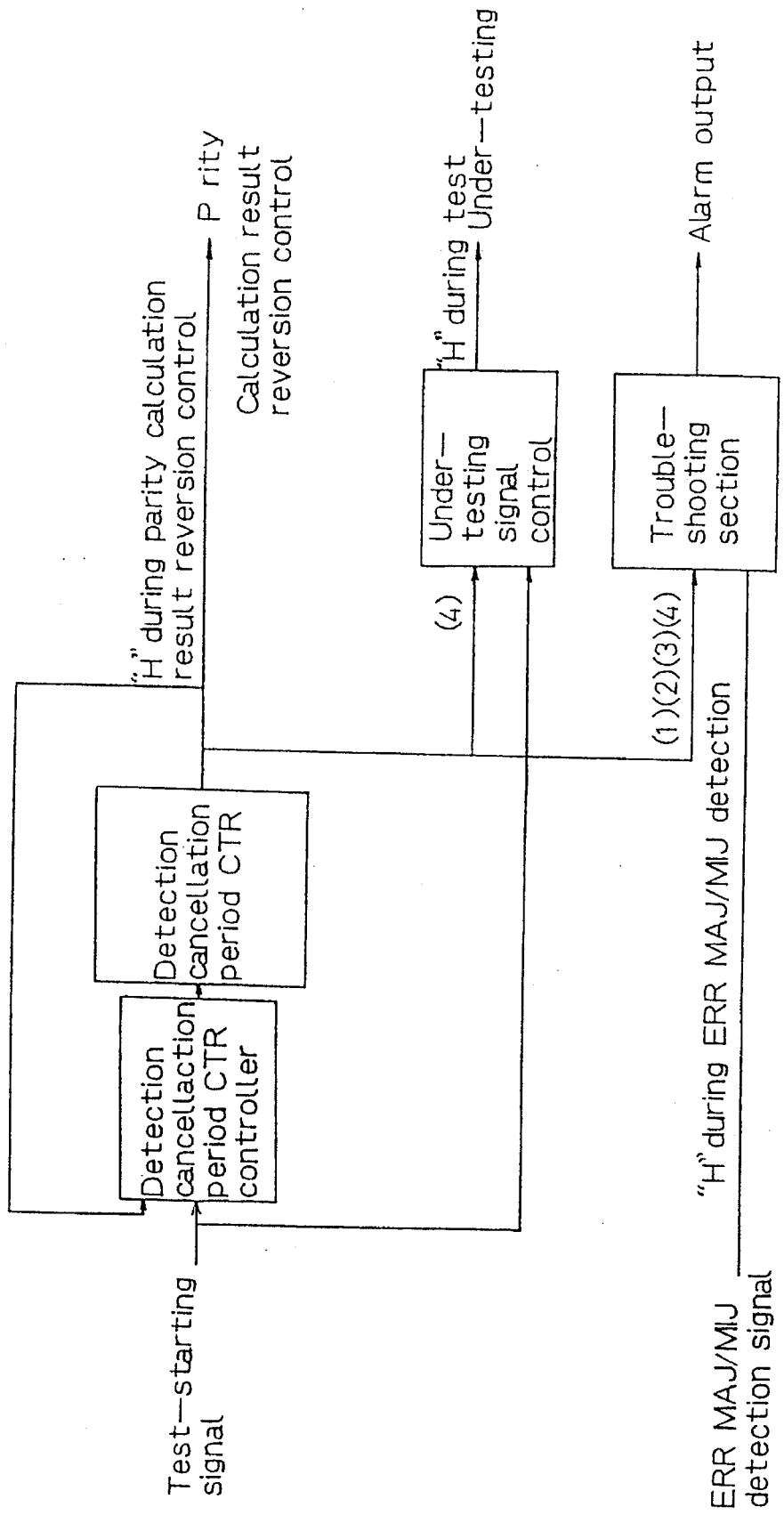
FIG. 19 is a functional block diagram for explaining a function of the ERR MAJ/MIN DET testing section.
Figure 20:
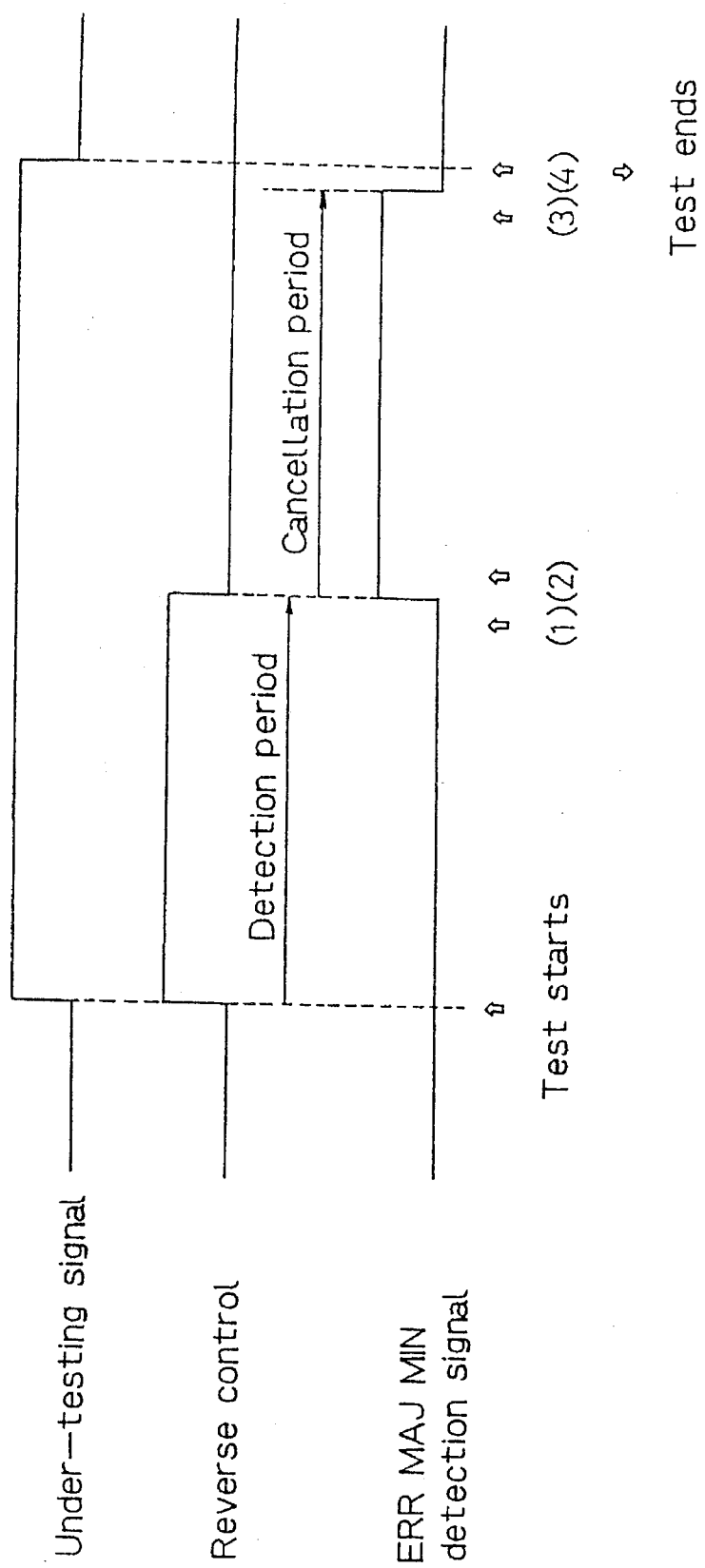
FIG. 20 is a timing chart illustrating the timing of signals of the ERR MAJ/MIN DET testing section.

FIG. 18 is a block diagram illustrating a circuit for testing an error major/minor detector (ERR MAJ/MIN DET) for detection of bit error rate of a transmission line. The circuit has an ERR MAJ/MIN DET testing section 56, selector (SEL) 57 and exclusive-OR circuit 58. The ERR MAJ/MIN DET 7a and parity checker 7b shown in FIG. 18 are provided in the transmission line alarm detector 7, and the parity calculator 14a are provided in the OH generator 14. FIG. 19 is a functional block diagram for explaining a function of the ERR MAJ/MIN DET testing section 56. FIG. 20 is a timing chart illustrating the timing of signals of the ERR MAJ/MIN DET testing section 56.

As shown, in response to a test starting signal input to the ERR MAJ/MIN DET testing section 56 from the self-monitoring controller 25, the ERR MAJ/MIN DET testing section 56 outputs an under-testing signal and enables a side 1 of the SEL 57. At the same time, the ERR MAJ/MIN DET testing section 56 outputs an "H" signal to the exclusive-OR circuit 58 to start a parity calculation result reversion control.

If a detection signal is output from the ERR MAJ/MIN DET 7a at the time indicated by the arrow (1) in FIG. 20 just before an error alarm detection period starts, the ERR MAJ/MIN DET testing section 56 outputs an alarm, and if not, the ERR MAJ/MIN DET testing section 56 does not output the alarm. Then, the reverse control is terminated after the error alarm detection period ends. Further, if the detection signal is not output immediately thereafter at the time indicated by the arrow (2), an alarm is output, and if the detection signal is output, the alarm is not output. Still further, if the detection signal is not output at the time indicated by the arrow (3) just before a cancellation period starts after the reverse control ends, an alarm is output, and if the detection signal is output, the alarm is not output. Yet further, if the detection signal is output at the time indicated by the arrow (4) after the cancellation period ends, an alarm is output, and if not, the alarm is not output. The ERR MAJ/MIN DET test is completed at the time indicated by the arrow (4).

Thus, the ERR MAJ/MIN DET is tested by the reverse control of B2-byte on the transmitter side.

Figure 21:
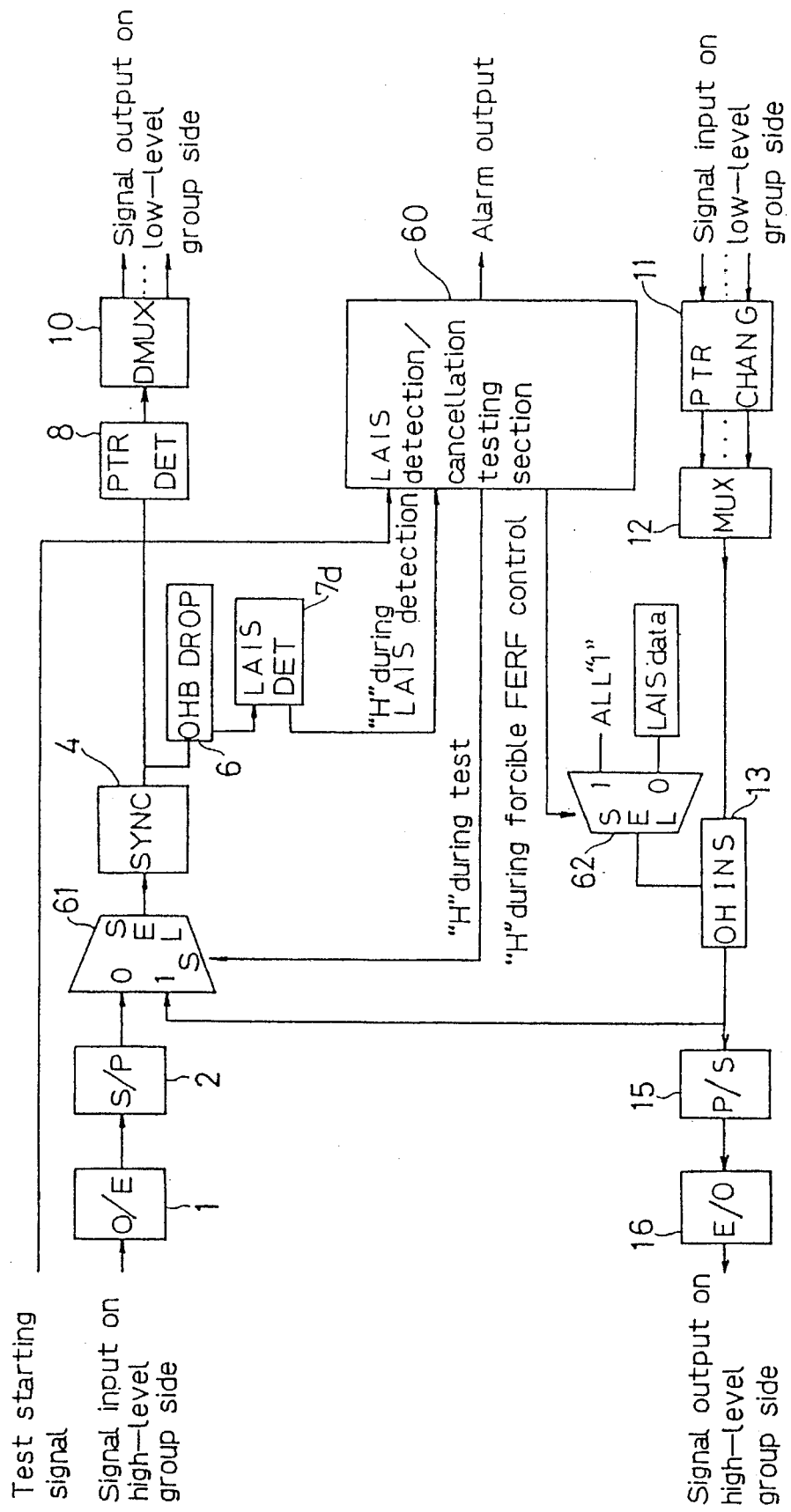
FIG. 21 is a block diagram illustrating a circuit for testing a line alarm indication signal detector (LAIS DET)
Figure 22:
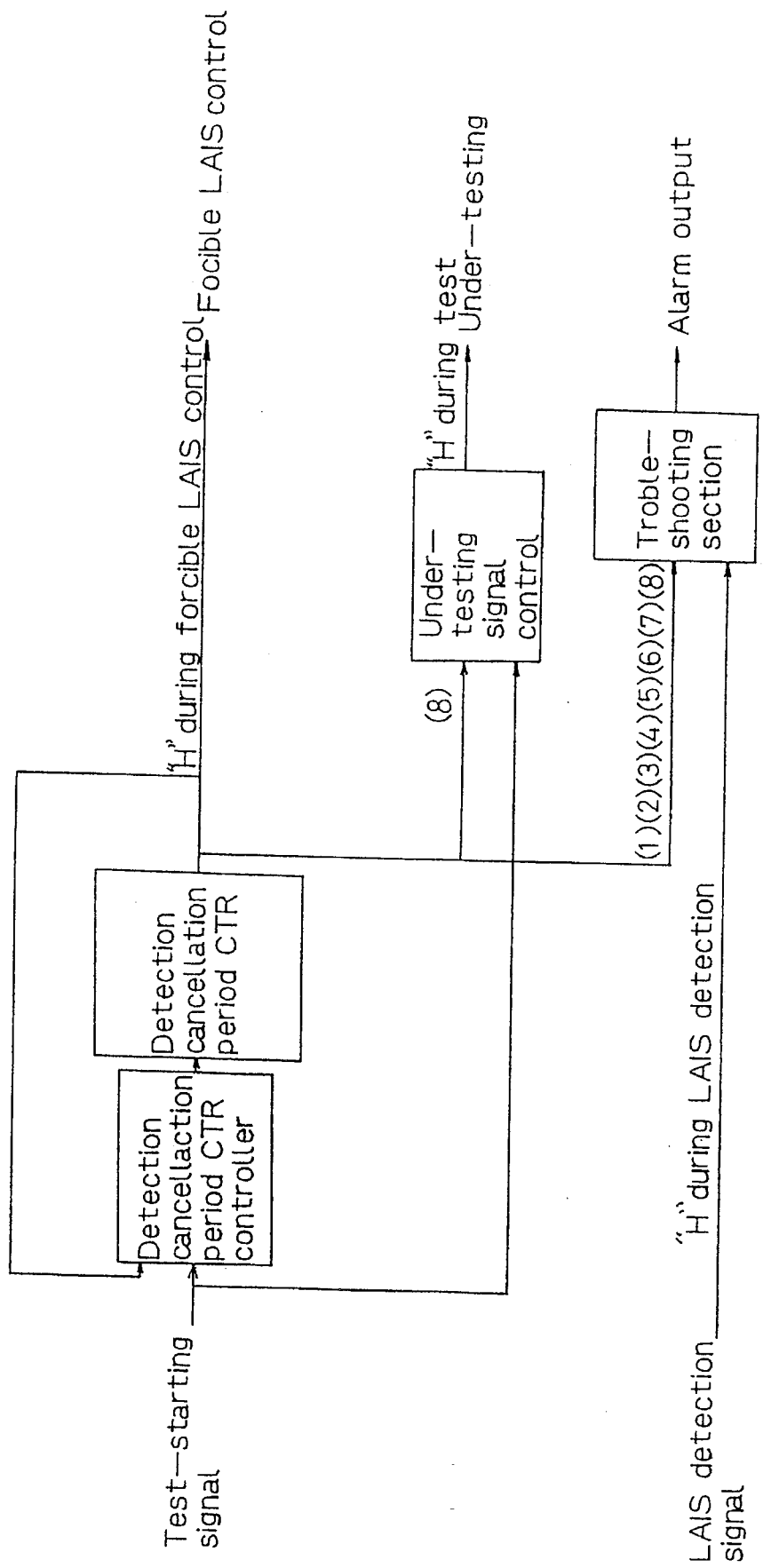
FIG. 22 is a functional block diagram for explaining a function of an LAIS detection/cancellation testing section.

FIG. 21 is a block diagram illustrating a circuit for testing a line alarm indication signal detector (LAIS DET). The circuit has an LAIS detection/cancellation testing section 60 and selectors (SELs) 61 and 62. The LAIS DET 7c shown in FIG. 21 is provided in the transmission line alarm detector 7. FIG. 22 is a functional block diagram for explaining a function of the LAIS detection/cancellation testing section 60, and FIG. 23 is a timing chart illustrating the timing of signals of the LAIS detection/cancellation testing section 60.

As shown, in response to a test starting signal input to the LAIS detection/cancellation testing section 60 from the self-monitoring controller 25, the LAIS detection/cancellation testing section 60 outputs an under-testing signal and enables a side 1 of the SEL 61. At the same time, the LAIS detection/cancellation testing section 60 enables a side 0 of the SEL 62 to start a signal-output forcing LAIS control.

Figure 23:
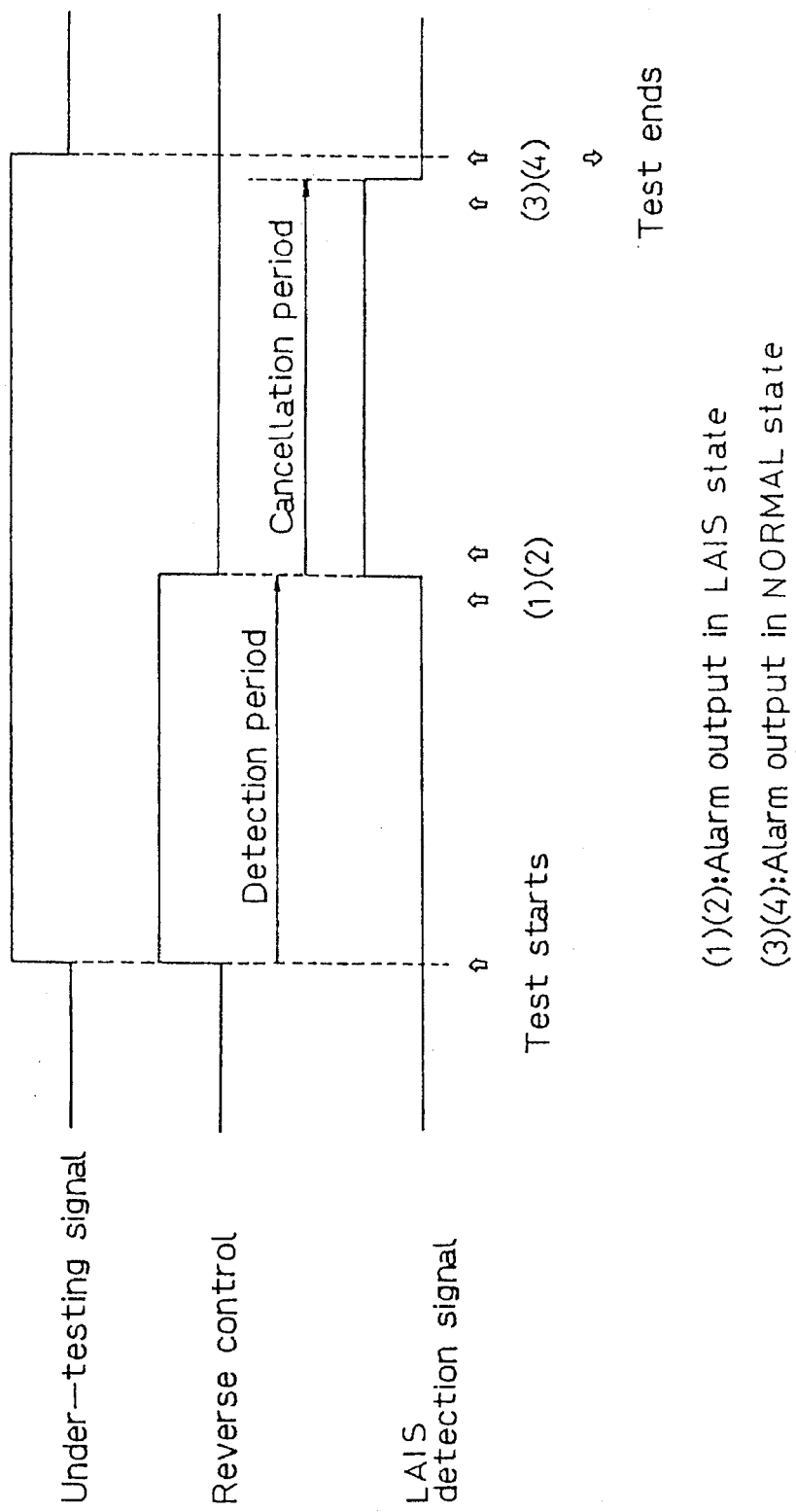
FIG. 23 is a timing chart illustrating the timing of signals of the LAIS detection/cancellation testing section.

If an LAIS detection signal is output from the LAIS DET 7c at the time indicated by the arrow (1) in FIG. 23 just before an LAIS detection period ends, the LAIS detection/cancellation testing section 60 outputs an alarm, and if not, the LAIS detection/cancellation testing section 60 does not output the alarm. Then, the forcible LAIS control is terminated after the LAIS detection period ends. Further, if the LAIS detection signal is not output immediately thereafter at the time indicated by the arrow (2), an alarm is output, and if the LAIS detection signal is output, the alarm is not output. Still further, if the LAIS detection signal is not output at the time indicated by the arrow (3) just before an LAIS cancellation period ends after the forcible LAIS control is terminated, an alarm is output, and if the LAIS detection signal is output, the alarm is not output. Yet further, if the LAIS detection signal is output at the time indicated by the arrow (4) after the LAIS cancellation period ends, an alarm is output, and if not, the alarm is not output. The LAIS DET test is completed at the time indicated by the arrow (4).

Thus, the LAIS detector is tested by assigning "111" to K2#1–6 to 8 bits on the transmitter side.

Figure 24:
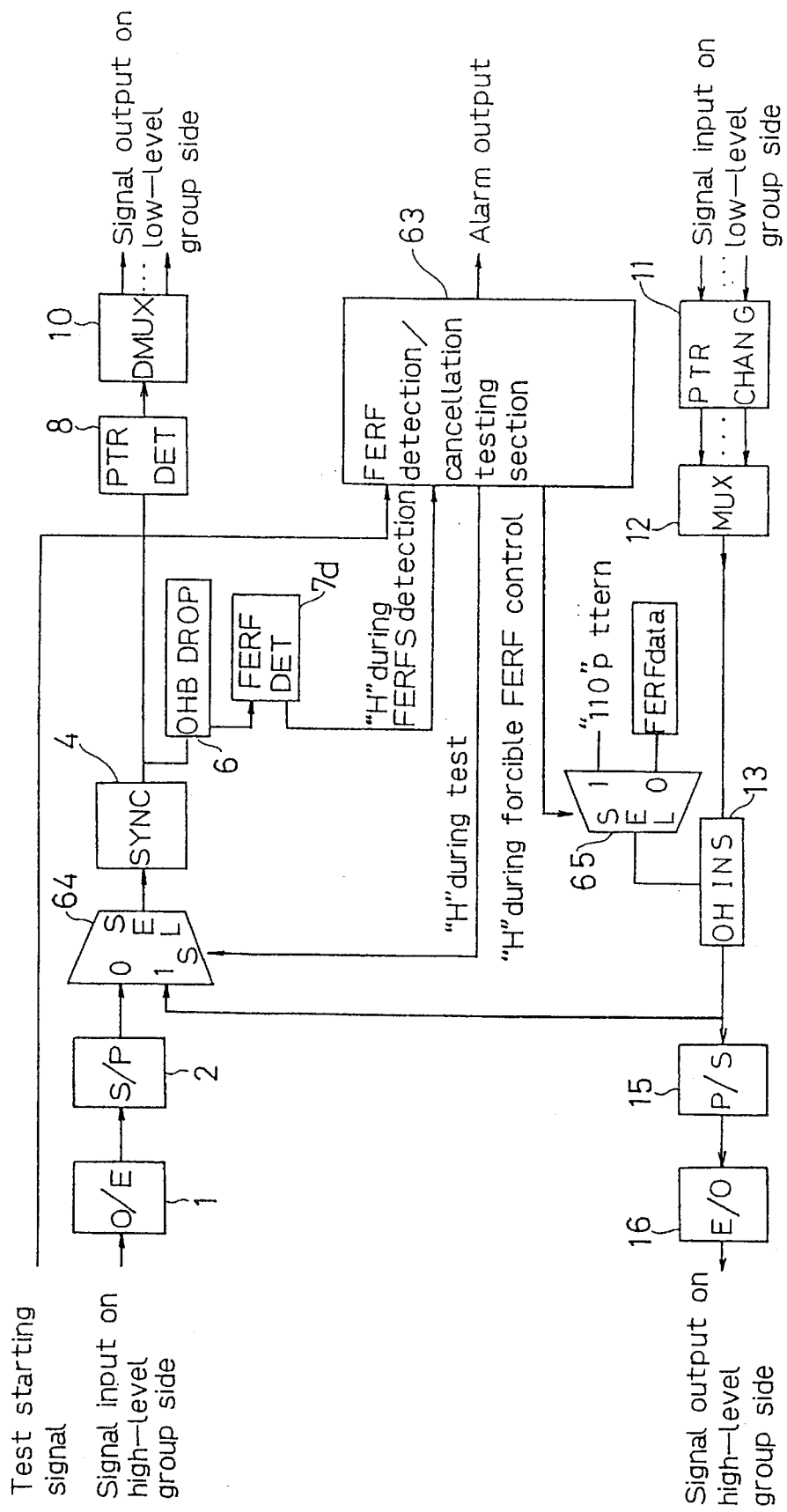
FIG. 24 is a block diagram illustrating a circuit for testing a far end receive failure detector (FERF DET)
Figure 25:
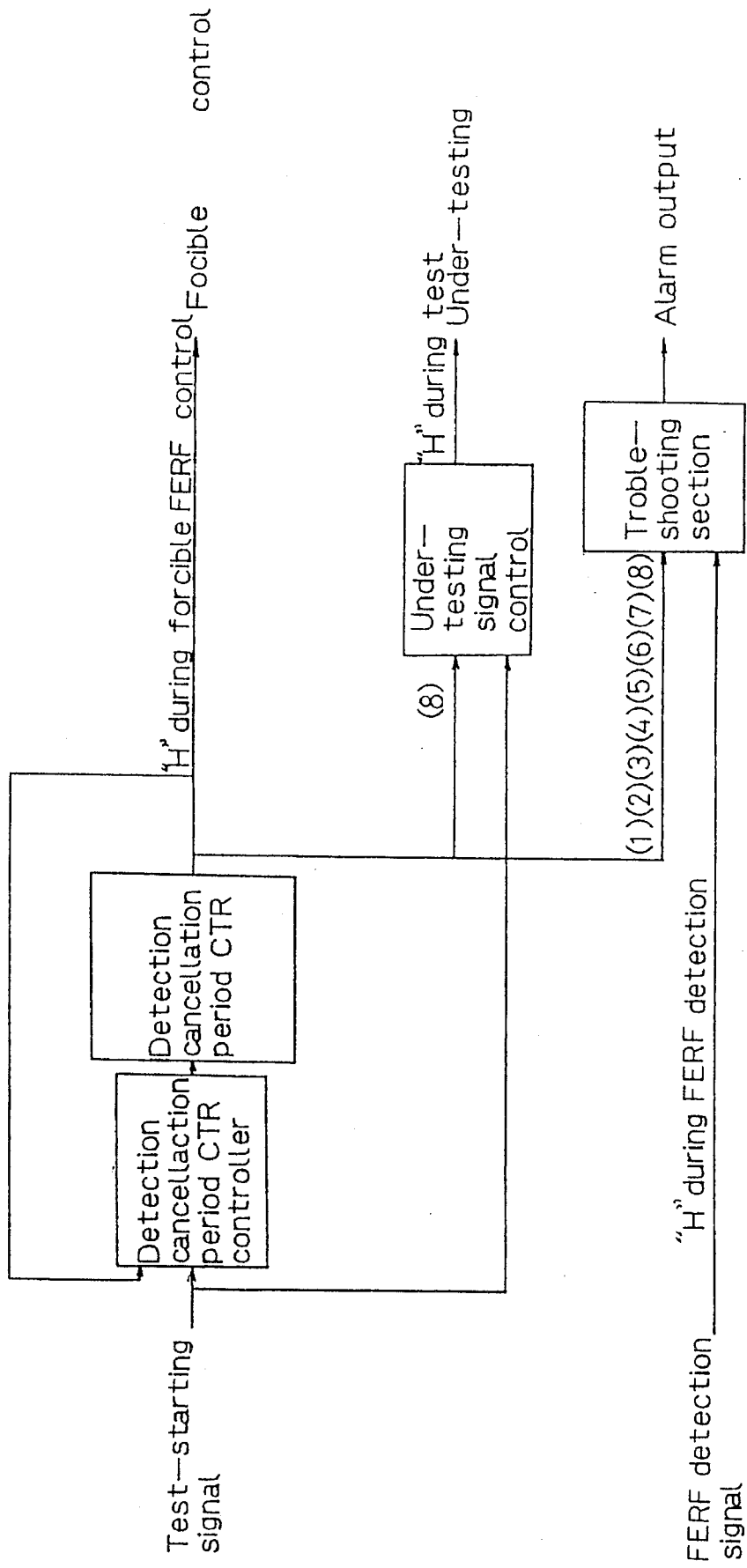
FIG. 25 is a functional block diagram for explaining a function of an FERF detection/cancellation testing section.

FIG. 24 is a block diagram illustrating a circuit for testing a far-end-receive failure detector (FERF DET). The circuit has an FERF detection/cancellation testing section 63. and selectors (SELs) 64 and 65. The FERF DET 7d shown in FIG. 24 is provided in the transmission line alarm detector 7. FIG. 25 is a functional block diagram for explaining a function of an FERF detection/cancellation testing section 63, and FIG. 26 is a timing chart illustrating the timing of signals of the FERF detection/cancellation testing section 63.

As shown, in response to a test starting signal input to the FERF detection/cancellation testing section 63 from the self-monitoring controller 25, the FERF detection/cancellation testing section 63 outputs an under-testing signal and enables a side 1 of the SEL 64. At the same time, the FERF detection/cancellation testing section 63 enables a side 0 of the SEL 65 to start a signal output forcible FERF control.

Figure 26:
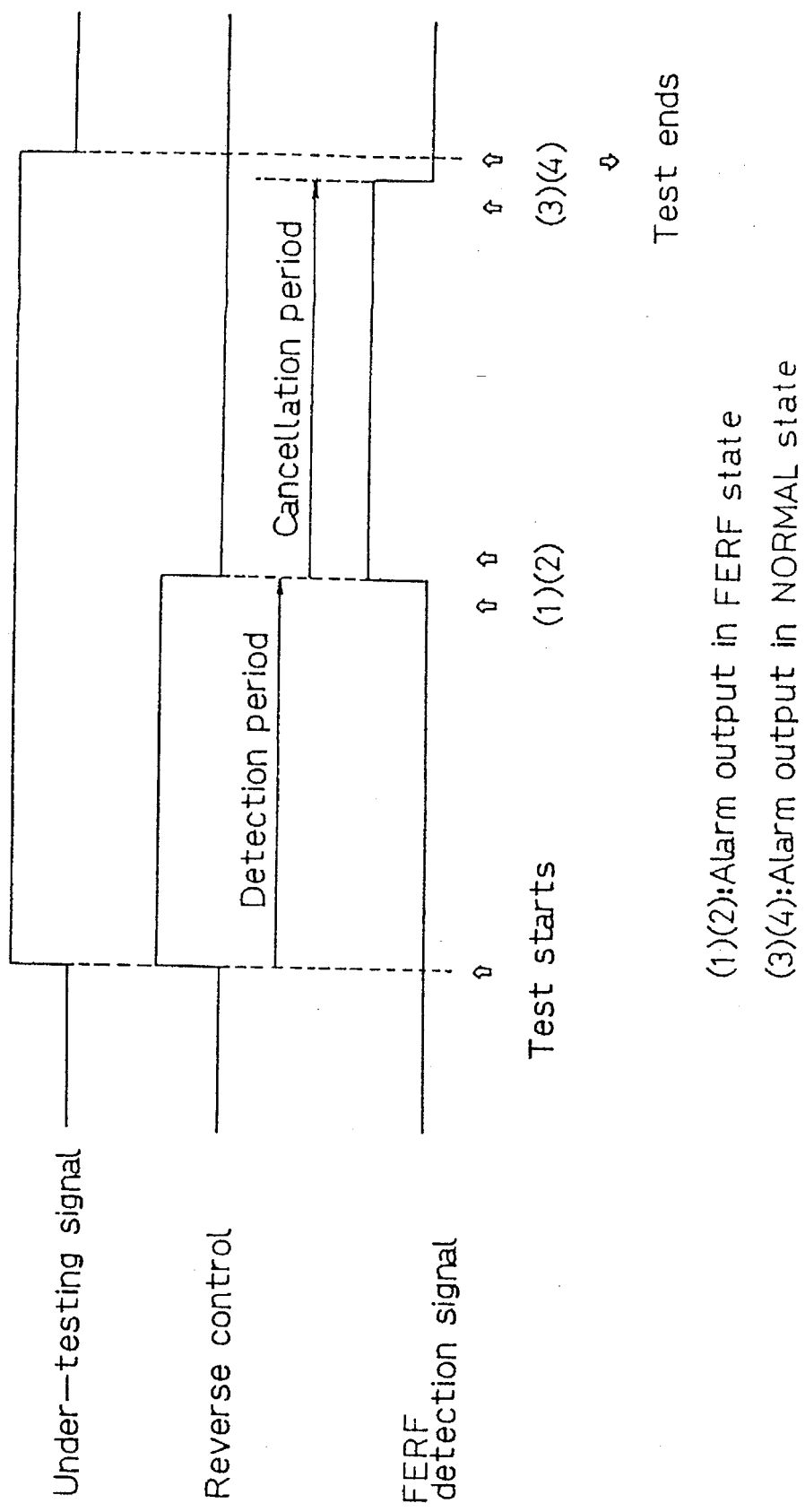
FIG. 26 is a timing chart illustrating the timing of signals of the FERF detection/cancellation testing section.

If an FERF detection signal is output from the FERF DET 7d at the time indicated by the arrow (1) in FIG. 26 just before an LAIS detection period ends, the FERF detection/ cancellation testing section 63 outputs an alarm, and if not, the FERF detection/cancellation testing section 63 does not output the alarm. Then, the forcible FERF control is terminated after the FERF detection period ends. Further, if the FERF detection signal is not output immediately thereafter at the time indicated by the arrow (2), an alarm is output, and if the FERF detection signal is output, the alarm is not output. Still further, if the FERF detection signal is not output at the time indicated by the arrow (3) just before an LAIS cancellation period ends after the forcible FERF control is terminated, an alarm is output, and if the FERF detection signal is output, the alarm is not output. Yet further, if the FERF detection signal is output at the time indicated by the arrow (4) after the LAIS cancellation period ends, an alarm is output, and if not, the alarm is not output. The FERF DET test is completed at the time indicated by the arrow (4).

Thus, the FERF DET is tested by assigning "110" to K2#1–6 to 8 bits on the transmitter side.

Figure 27:
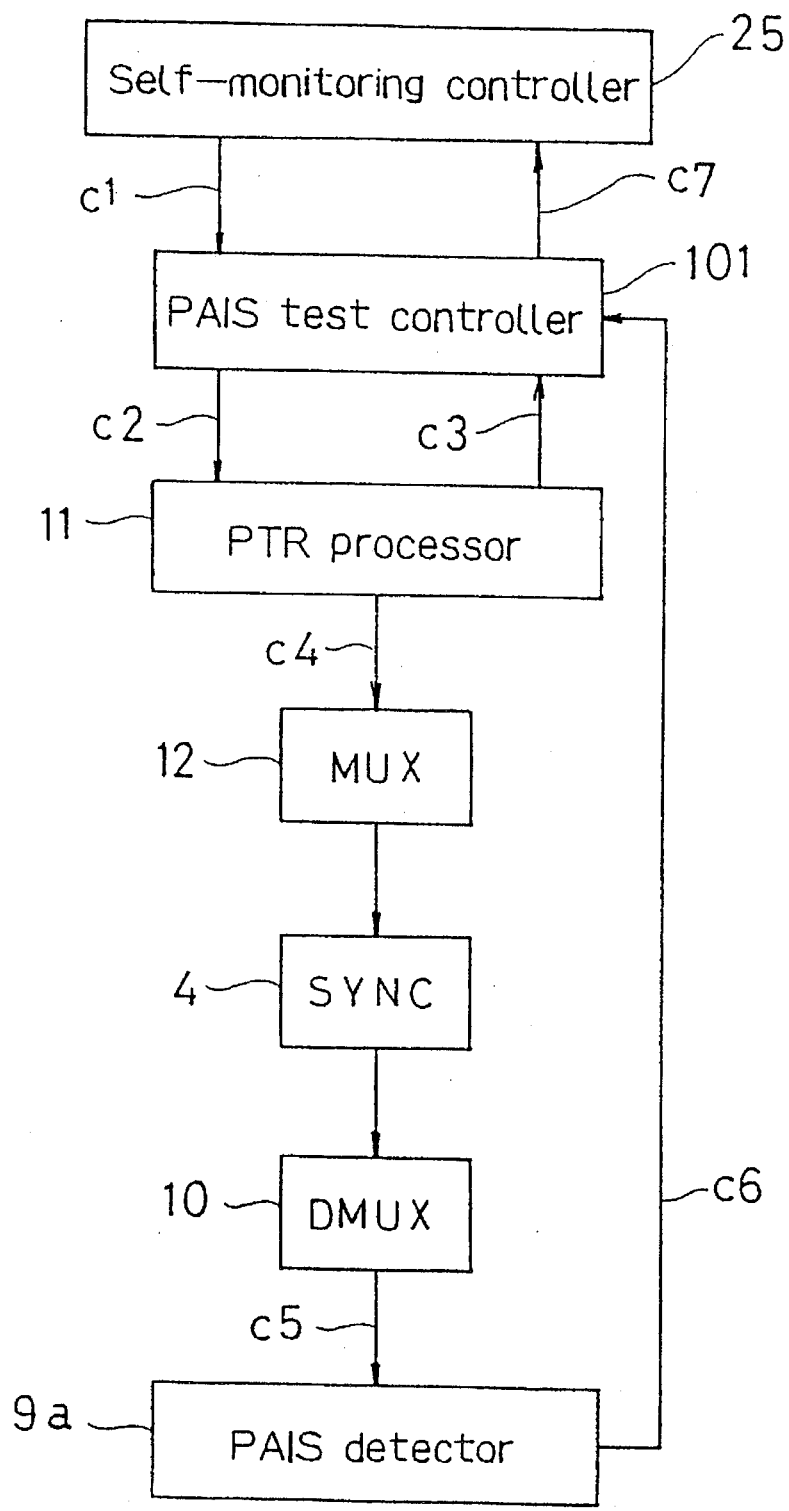
FIG. 27 is a block diagram illustrating a structure of a circuit for a path alarm indication signal (PATS) test.
Figure 28:
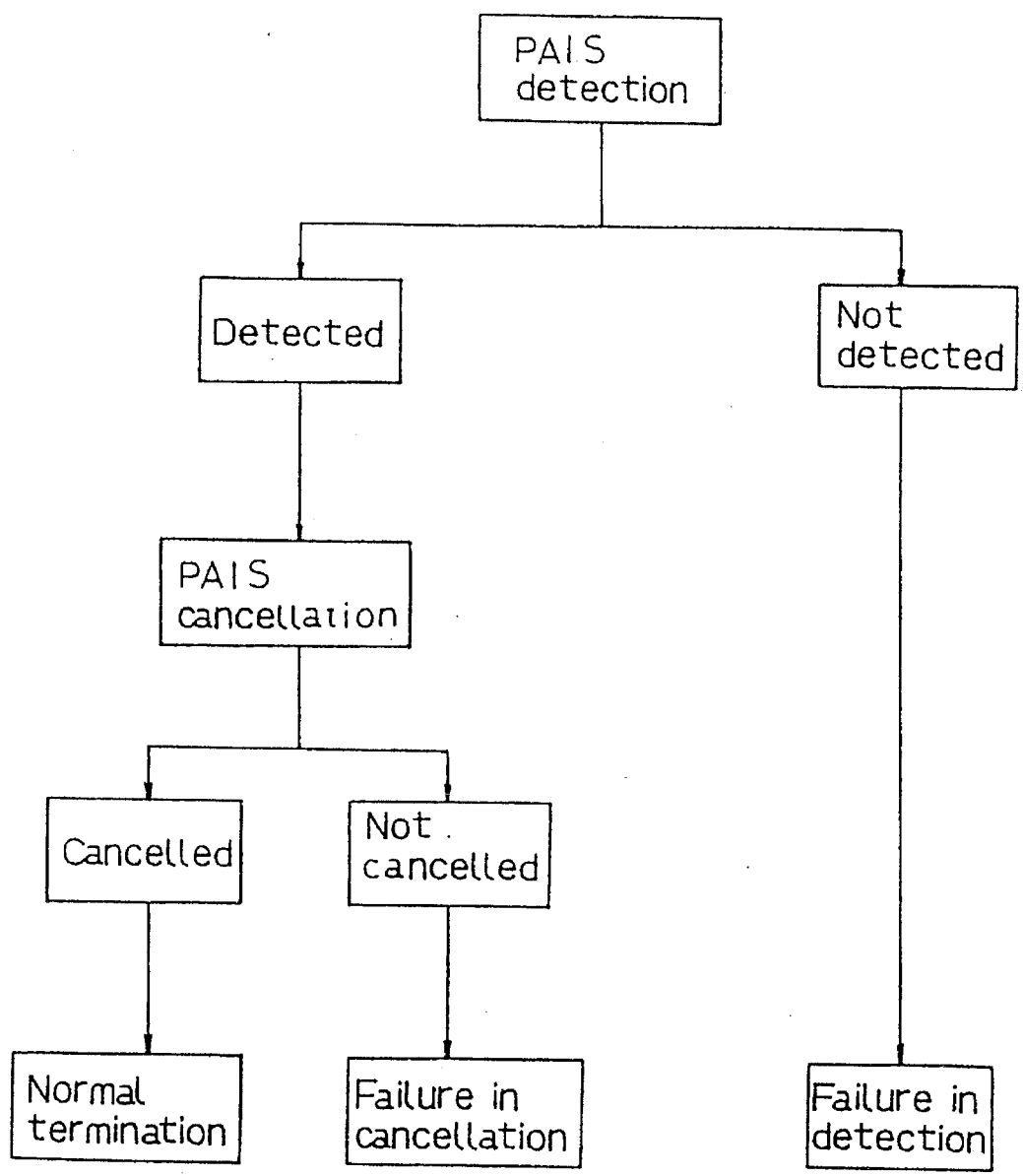
FIG. 28 is a flow chart for explaining a process of the PAIS test.

FIG. 27 is a block diagram illustrating a structure of a circuit for a path alarm indication signal (PAIS) test. This circuit is adapted to check if a PAIS is normally detected in a PAIS detector 9a of the path alarm detector 9. The circuit has a PAIS testing controller 101. FIG. 28 is a flow chart for explaining a process of the PAIS test.

As shown, the self-monitoring controller 25 outputs a test starting signal c1 to the PAIS test controller 101. Upon receiving the test starting signal c1, the PAIS test controller 101 outputs a PAIS command signal c2 to the PTR processor 11 for three consecutive frames. The PTR processor 11 sends a frame timing signal c3 back to the PAIS test controller 101, thereby allowing the PAIS test controller 101 to determine a time period of three frames.

After receiving the PAIS command signal c2, the PTR processor 11 outputs data c4 having PAIS codes which are assigned to H1- and H2-bytes thereof (which will be described. later) for three consecutive frames. The output data c4 is processed in the MUX 12, SYNC 4 and DMUX 10, and then input to the PAIS detector 9a. When the PAIS codes are input to the H1- and H2-bytes of the data c5 for three consecutive frames, the PAIS detector 9a sends a PAIS detection signal c6 to the PAIS test controller 101. The PAIS test controller 101 monitors the frame timing signal c3 to detect the timing of receiving the PAIS detection signal c6.

After outputting the PAIS command signal c2 for three consecutive frames, the PAIS test controller 101 stops the PAIS command signal c2, whereby the PAIS command is cancelled and the PTR processor 11 returns to an ordinary mode. When the PTR processor 11 returns to the ordinary mode, the data c4 having triple-matched normal PRT values or NDF (new data flag) is output, and the PAIS detector 9a cancels the PAIS detection signal c6. When the PAIS detection signal c6 is cancelled, the PAIS test controller 101 judges that the test is normally terminated, and then sends a PAIS test normal termination signal c7 to the self-monitoring controller 25.

If the PAIS detection signal c6 is not cancelled in a state where the PAIS detector 9a outputs the PAIS detection signal c6 when data c4 for the PAIS cancellation is output, the PAIS test controller 101 judges that the PAIS cancellation fails, and outputs a cancellation failure signal c7.

On the other hand, if the PAIS detector 9a does not output the PAIS detection signal c6 when the data c4 having the PAIS codes is output from the PTR processor 11 for three consecutive frames, the PAIS test controller 101 judges that the PAIS detection fails, and outputs a detection failure signal a7.

The aforesaid PAIS codes are shown in Table 1.

TABLE 1

| H1 byte | H2 byte |
| --- | --- |
| 11111111 | 11111111 |

Thus, the PAIS detector is tested by controlling the H1- and H2-bytes on the transmitter side.

Figure 29:
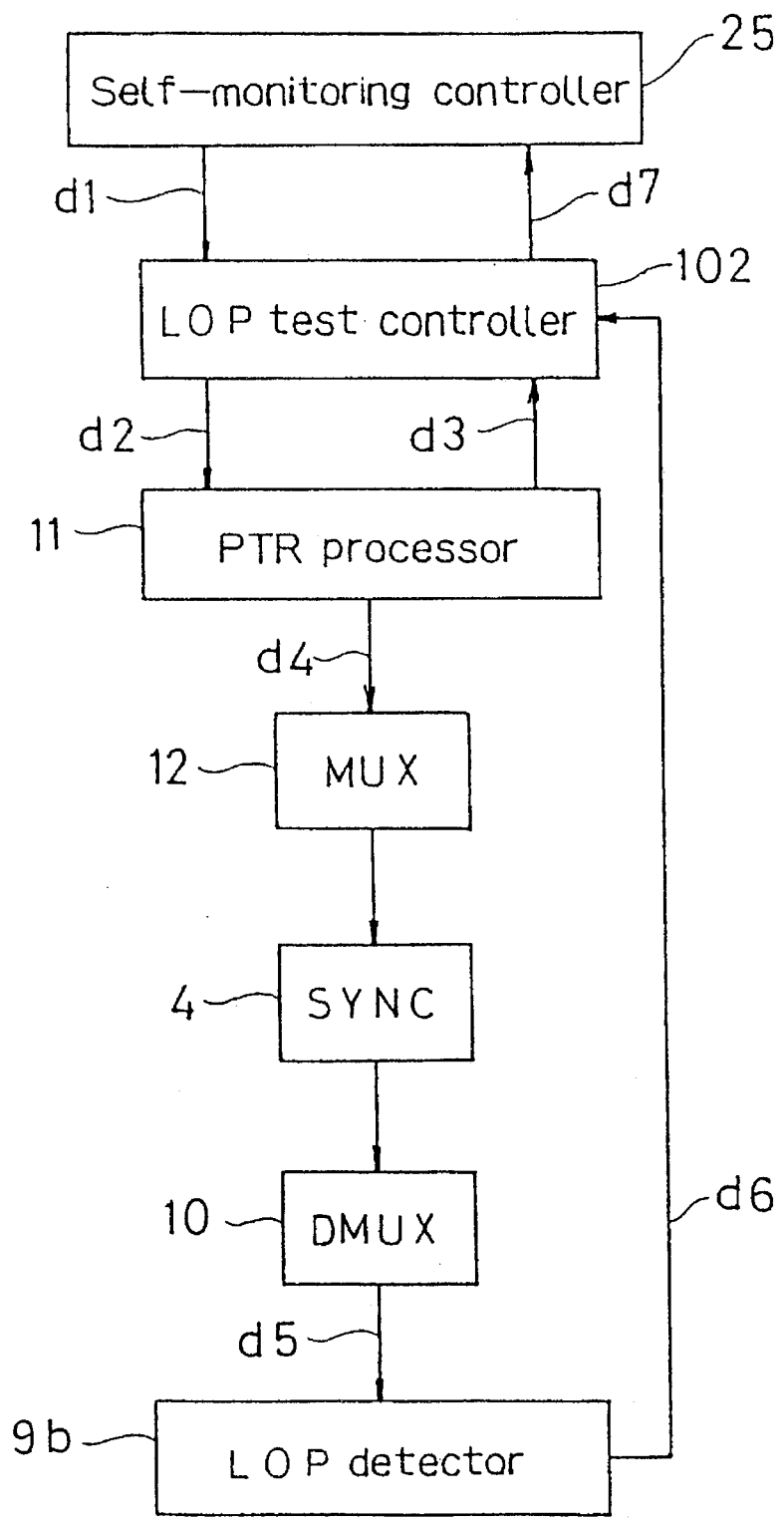
FIG. 29 is a block diagram illustrating a structure of a circuit for a loss-of-pointer (LOP) test.
Figure 30:
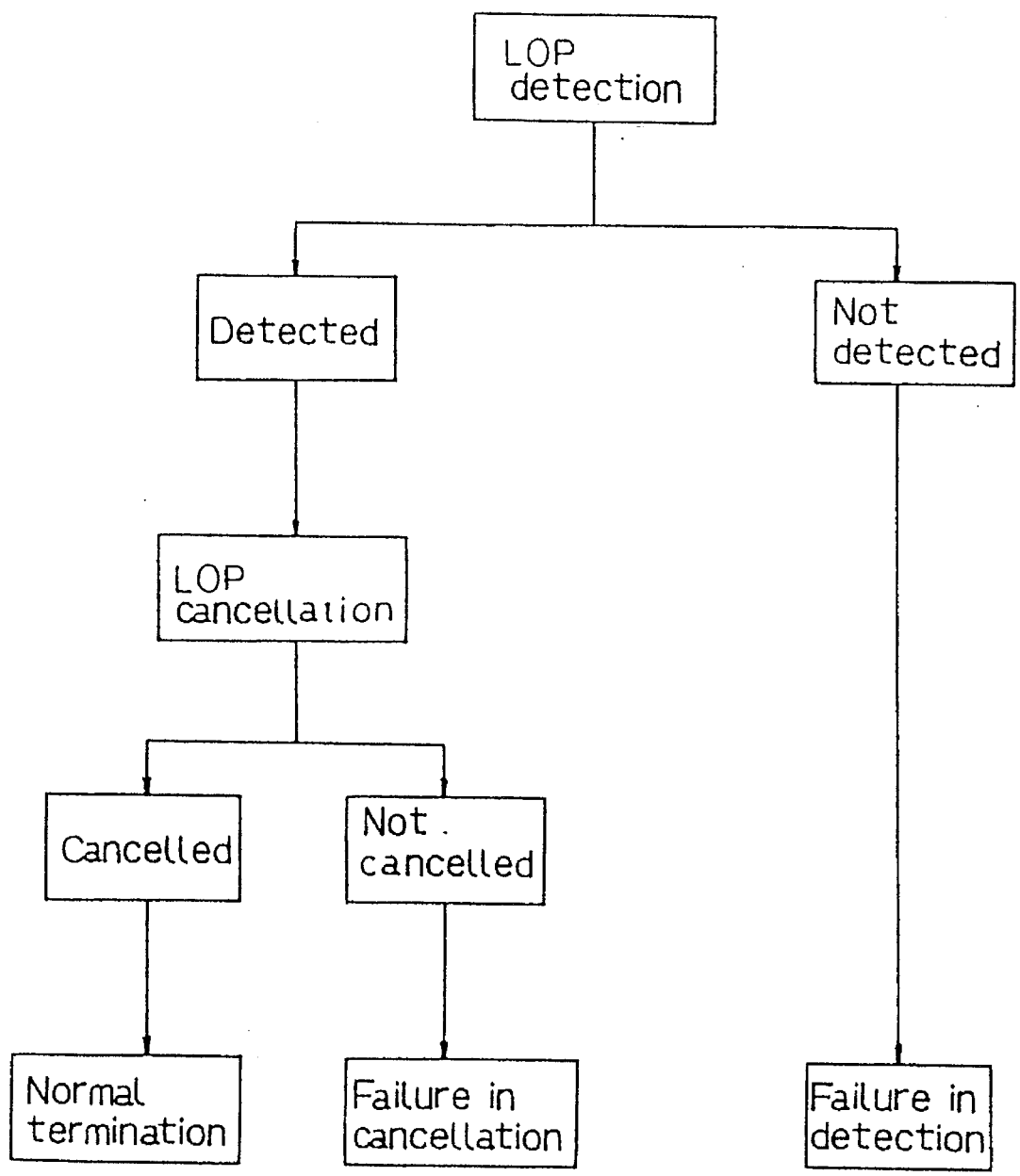
FIG. 30 is a flow chart for explaining a process of the LOP test.

FIG. 29 is a block diagram illustrating a structure of a circuit for a loss-of-pointer (LOP) test. This circuit is adapted to check if an LOP detector 9b normally detects an LOP. The circuit has an LOP test controller 102. FIG. 30 is a flow chart for explaining a process of the LOP test.

As shown, the self-monitoring controller 25 outputs a test starting signal d1 to the LOP test controller 102. Upon receiving the test starting signal d1, the LOP test controller 102 outputs an LOP command signal d2 to the PTR processor 11 for eight consecutive frames. The PTR processor 11 sends a frame timing signal d3 back to the LOP test controller 102, thereby allowing the LOP test controller 102 to determine the time period of eight frames.

After receiving the LOP command signal d2, the PTR processor 11 outputs data d4 having LOP codes which are assigned to H1- and H2-bytes thereof (which will be described later) for eight consecutive frames. The output data d4 is processed in the MUX 12, SYNC 4 and DMUX 10, and then input to the LOP detector 9b. When the LOP codes are input to the H1- and H2-bytes of the data d5 for eight consecutive frames, the LOP detector 9b sends the LOP detection signal d6 to the LOP test controller 102. The LOP test controller 102 monitors the frame timing signal d3 to detect the timing of receiving the LOP detection signal d6.

After outputting the LOP command signal d2 for eight consecutive frames, the LOP test controller 102 stops the LOP command signal d2, whereby the LOP command is cancelled and the PTR processor 11 returns to an ordinary state. When the PTR processor 11 returns to the ordinary state, data d4 having triple-matched normal PRT values or triple-matched PAIS is output, and the LOP detector 9b cancels the LOP detection signal d6. When the LOP detection signal d6 is cancelled, the LOP test controller 102 judges that the test is normally terminated, and then sends an LOP test normal termination signal d7 to the self-monitoring controller 25.

If the LOP detection signal d6 is not cancelled in a state where the LOP detector 9b outputs the LOP detection signal d6 when data d4 for the LOP cancellation is output, the LOP test controller 102 judges that the LOP cancellation fails, and outputs a cancellation failure signal d7.

On the other hand, if the LOP detector 9d does not output the LOP detection signal d6 when the data d4 having the LOP codes is output from the PTR processor 11 for eight consecutive frames, the LOP test controller 102 judges that the LOP detection fails, and outputs a detection failure signal d7.

The aforesaid LOP codes are shown in Table 2.

TABLE 2

| H1 byte | H2 byte |
| --- | --- |
| 1001XX00 | 00000000 |

Thus, the LOP detector is tested by controlling E1- and H2-bytes on the transmitter side.

Figure 31:
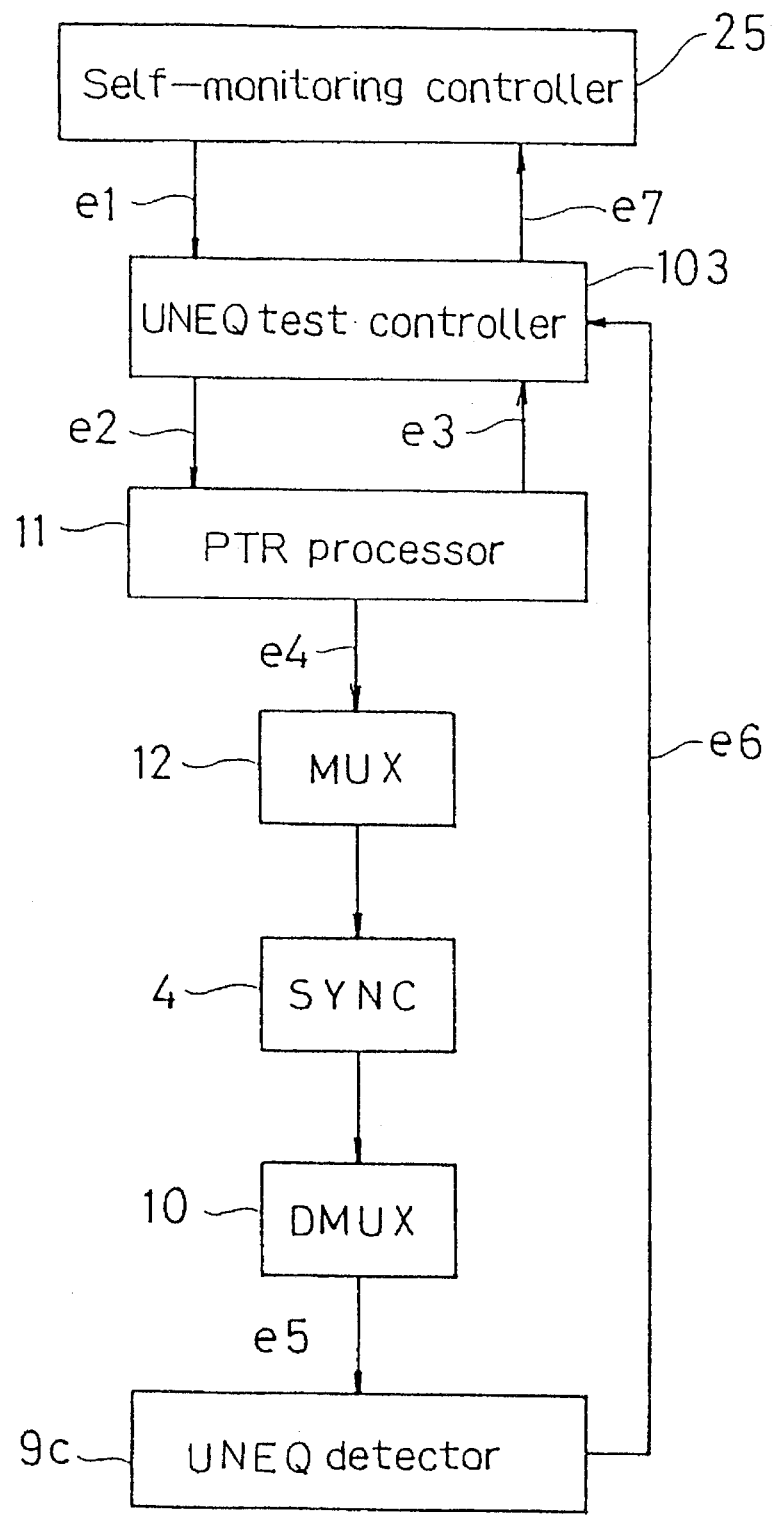
FIG. 31 is a block diagram illustrating a structure of a circuit for an unequipment (UNEQ) test.
Figure 32:
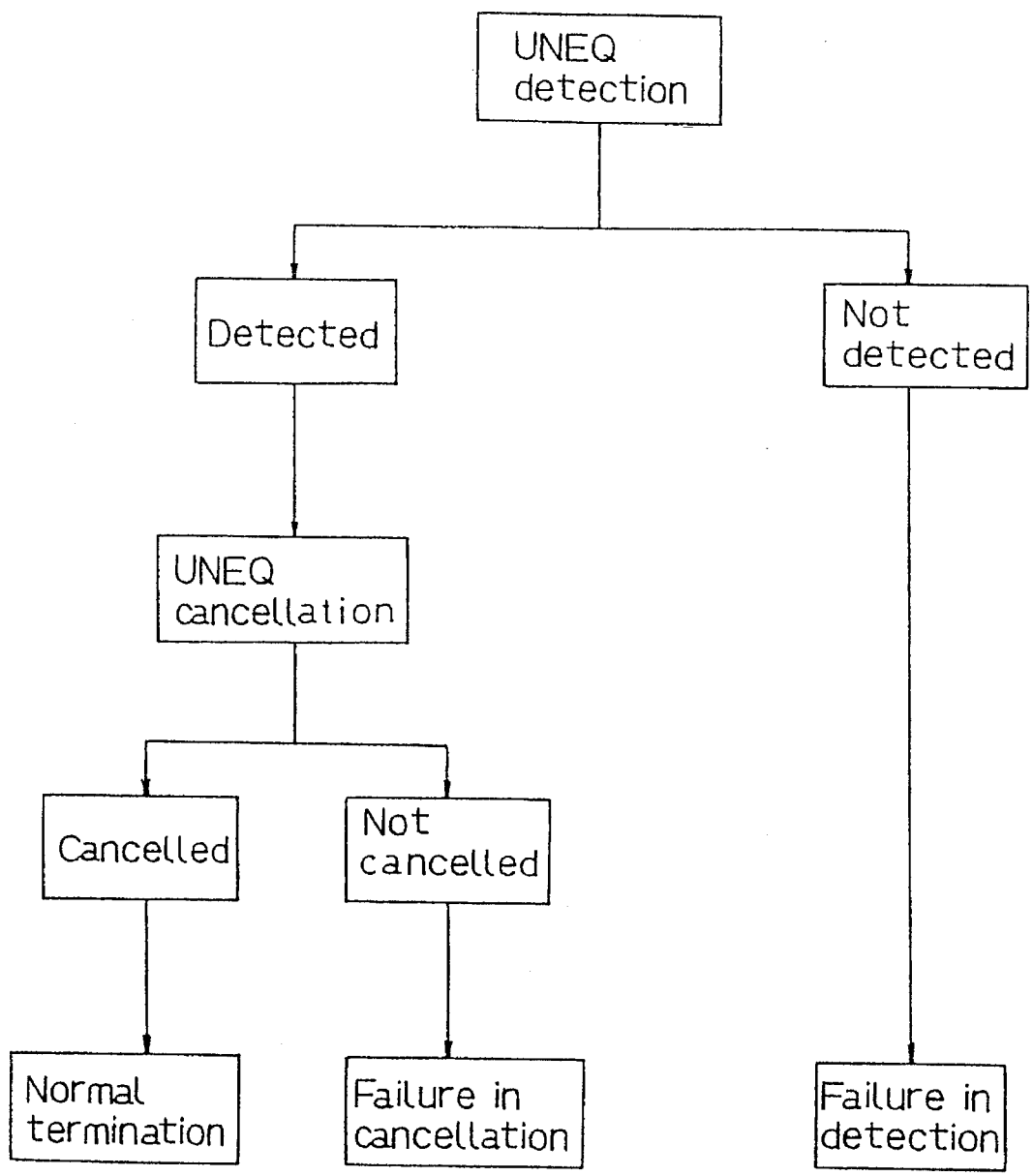
FIG. 32 is a flow chart for explaining a process of the UNEQ test.

FIG. 31 is a block diagram illustrating a structure of a circuit for a unequipment (UNEQ) test. This circuit is adapted to check if an unequipment detector 9c of the path alarm detector 9 normally performs a UNEQ detection. The circuit has an UNEQ test controller 103. FIG. 32 is a flow chart for explaining a process of the UNEQ test.

As shown, the self-monitoring controller 25 outputs a test starting signal e1 to the UNEQ test controller 103. Upon receiving the test starting signal e1, the UNEQ test controller 103 outputs a UNEQ command signal e2 to the PTR processor 11 for four consecutive frames. The PTR processor 11 sends a frame timing signal e3 back to the UNEQ test controller 103, thereby allowing the UNEQ test controller 103 to determine a time period of four frames.

After receiving the UNEQ command signal e2, the PTR processor 11 outputs data e4 having UNEQ codes assigned to H1- and H2-bytes thereof (which will be described later) and ALLZERO assigned to the other bites thereof for four consecutive frames. The output data e4 is processed in the MUX 12, SYNC 4 and DMUX 10, and then input to the UNEQ detector 9c. When the ALL-ZERO is input to the C2-byte of the data e5 for three consecutive frames, the UNEQ detector 9c sends the UNEQ detection signal e6 to the UNEQ test controller 103. The UNEQ test controller 103 monitors the frame timing signal e6 to detect the timing of receiving the UNEQ detection signal e6.

After outputting the UNEQ command signal e2 for four consecutive frames, the UNEQ test controller 103 stops the UNEQ command signal e2, whereby the UNEQ command is cancelled and the PTR processor 11 returns to an ordinary state. When the PTR processor 11 returns to the ordinary state and the data e4 having codes other than ALL-ZERO assigned to C2-byte thereof is output consecutively six times, the UNEQ detector 9c cancels the UNEQ detection signal e6. When the UNEQ detection signal e6 is cancelled, the UNEQ test controller 103 judges that the test is normally terminated, and then sends a UNEQ test normal termination signal e7 to the self-monitoring controller 25.

If the UNEQ detection signal e6 is not cancelled in a state where the UNEQ detector 9c outputs the UNEQ detection signal e6 when the data e4 for the UNEQ cancellation is output, the UNEQ test controller 103 judges that a UNEQ cancellation fails, and outputs a cancellation failure signal e7.

On the other hand, if the UNEQ detector 9c does not output the UNEQ detection signal e6 when the data e4 having the UNEQ codes is output from the PTR processor 11 for three consecutive frames, the UNEQ test controller 103 judges that a UNEQ detection fails, and outputs a detection failure signal e7.

The aforesaid UNEQ codes are shown in Table 3.

TABLE 3

| H1 byte | H2 byte | C2 byte |
| --- | --- | --- |
| 01100000 | 00000000 | 00000000 |

Thus, the UNEQ detector is tested by controlling H1-, H2- and C2-bytes on the transmitter side.

Figure 33:
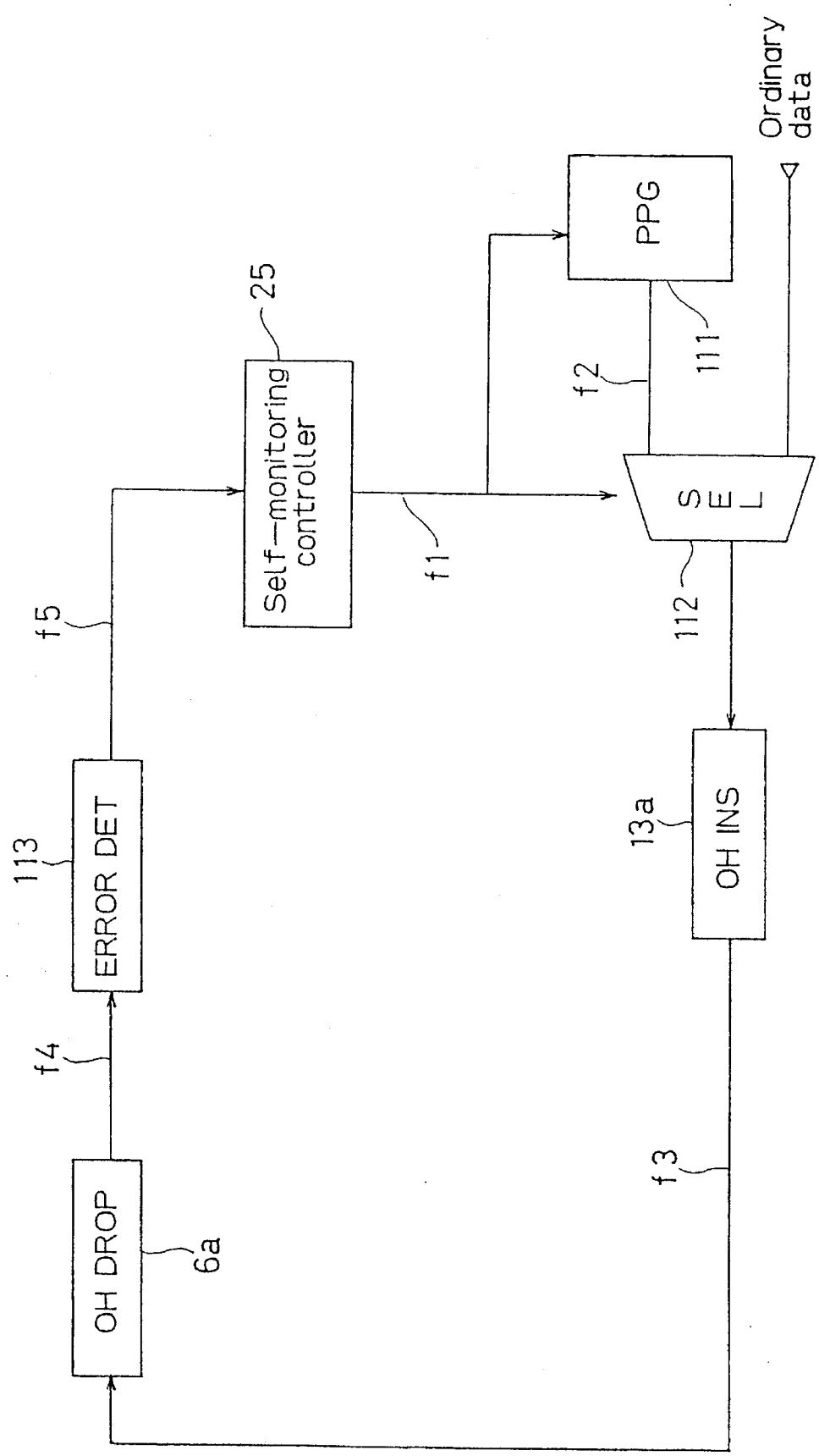
FIG. 33 is a block diagram illustrating a structure of a circuit for an overhead insertion/overhead drop (OH INS/OH DROP) test.

FIG. 33 is a block diagram illustrating a structure of a circuit for an overhead insertion/overhead drop (OH INS/ OH DROP) test. This circuit is adapted to check if the functions of an overhead insertion (OH INS) section 13a of the OH processor 13 and an overhead drop (OH DROP) section 6a of the overhead drop terminal 6 are normal. In this OH. INS/OH DROP test, the functions of the OH INS section 13a and OH DROP section 6a are checked based on a PN pattern.

As shown, the self-monitoring controller 25 outputs a test starting signal f1 to a PN pattern generator (PPG) 111 and selector (SEL) 112. When receiving the test starting signal f1, the PPG 111 generates a PN pattern, and the SEL 112 switches the input selection from an ordinary input to a test input. That is, the data input mode is switched from an ordinary data mode to a PN pattern data mode.

A PN pattern f2 generated by the PPG 111 is input to the OH INS section 13a, and an output f3 of the OH INS section 13a is input to the OH DROP section 6a. A PN pattern f4 extracted in the OH DROP section 6a is input to an error detector (ERROR DET) 113, and the ERROR DET 113 checks if the PN pattern is correct.

If an erroneous PN pattern is detected by the ERROR DET 113, it is judged that an operation of either OH INS section 13a or OH DROP section 6a is abnormal. If the PN pattern is correct, it is judged that both the OH INS section 13a and OH DROP 6a section normally operate. A test result signal f5 indicative of such a test result is sent to the self-monitoring controller 25.

Thus, the overhead data insertion and drop functions are tested by inserting a PN pattern signal and detecting an error in a dropped PN pattern signal.

Figure 34:
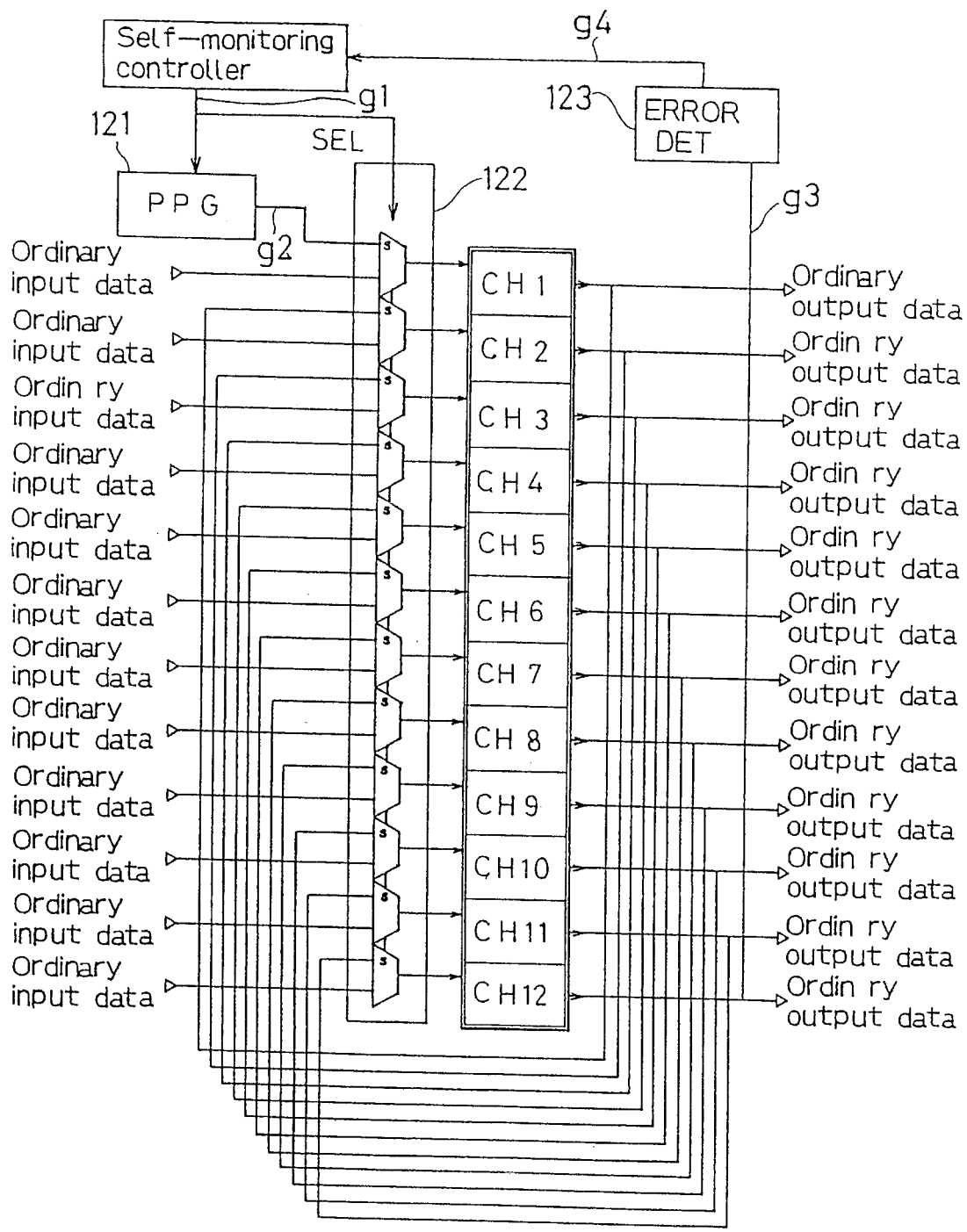
FIG. 34 is a block diagram illustrating a structure of a circuit for checking channels connected in tandem.

FIG. 34 is a block diagram illustrating a structure of a circuit for checking channels connected in tandem. The optical terminal system of the present invention has 12 channels CH1 to CH12, and the circuit is adapted so as to test all the channels at one time.

In this circuit, the channels CH1 through CH12 connected in tandem through main signal data lines are checked by PN pattern signals.

As shown, the self-monitoring controller 25 outputs a test starting signal g1 to the PPG 121 and SEL 122. When receiving the test starting signal g1, the PPG 121 generates a PN pattern, and the SEL 122 switches the input selection from an ordinary input to a test input. That is, the data input mode is switched from an ordinary data mode to a PN-pattern- data tandem connection mode. The switching of the SEL 122 allows the channels CH1 through CH12 to be connected in tandem.

A PN pattern g2 generated by the PPG 121 is input to the channel CH1, and an output of the channel CH1 is input to the channel CH2. Thus, the same PN pattern data passes from the channel CH1 to the channel CH12 by connecting the channels CH1 through CH12 in tandem. A PN pattern data g3 output from the channel CH12 is input to the error detector (ERROR DET) 123, and the ERROR DET 123 checks if the PN pattern is correct.

If an erroneous PN pattern is detected by the ERROR DET 123, it is judged that there is any defective channel in the channels CH1 through CH12. If the PN pattern is normal, it is judged that all the channels CH1 through CH12 normally operate. A test result signal g4 indicative of such a test result is sent to the self-monitoring controller 25.

By using the circuit for tandem connection of channels shown in FIG. 34, a test is carried out to check if a pointer value is normally decremented in the PTR processor 11, i.e., to check if a pointer changer of the PTR processor 11 normally performs a decrement operation.

In this test, the self-monitoring controller 25 outputs a test starting signal g1 to the PPG 121 and SEL 122 to start the test. When receiving the test starting signal g1, the PPG 121 appropriately generates data g2 in the H1- and H2-bytes of STM-1 in accordance with a phase transition diagram as shown in FIG. 35, and then sends the data g2 to the SEL 122.

When receiving the test starting signal g1 from the self-monitoring controller 25, the SEL 122 switches the data path from an ordinary data path to a test data path. As a result, the data is input from the PPG 121 to the channel CH1 and then from the channel CH1 to the channel CH2 through tandem connection.

The data input from the PPG 121 to the channel CH1 is output to the channel CH2 after the pointer value thereof is changed. Then, the data output from the channel CH1 to the channel CH2 is output after the pointer value thereof is changed, and this process is repeated until the data is output to the channel CH12.

After this operation is repeated for about 100 consecutive frames in accordance with the phase transition diagram shown in FIG. 35, the ERROR EDT 123 which monitors the output g3 of the channel CH12 checks if the decrement operation is normally carried out without causing data slippage or the like failure. If the decrement operation is normally carried out, the ERROR DET 123 sends back to the self-monitoring controller 25 a test normal termination signal g4 indicating that the decrement test is normally terminated. If the decrement operation is not carried out normally, the ERROR DET 123 sends back to the self-monitoring controller 25 a test abnormal termination signal g4 indicative of failure in the decrement test.

By using the circuit for tandem connection of channels shown in FIG. 34, a test is carried out to check if a pointer value is normally incremented in the PTR processor 11, i.e., to check if a pointer changer of the PTR processor 11 normally performs an increment operation.

In this test, the self-monitoring controller 25 outputs the test starting signal g1 to the PPG 121 and SEL 122 to start the test. When receiving the test starting signal g1, the PPG 121 appropriately generates data g2 in the H1- and H2- bytes of STM-1 in accordance with a phase transition diagram as shown in FIG. 36, and then sends the data g2 to the SEL 122.

When receiving the test starting signal g1 from the self-monitoring controller 25, the SEL 122 switches the data path from the ordinary data path to the test data path.. As a result, the data is input from the PPG 121 to the channel CE1 and then from the channel CH1 to the channel CH2 through tandem connection.

The data input from the PPG 121 to the channel CH1 is output to the channel CH2 after the pointer value thereof is changed. Then, the data input from the channel CH1 to the channel CH2 is output after the pointer value thereof is changed, and this process is repeated until the data is output to the channel CH12.

After this operation is repeated for about 100 consecutive frames in accordance with the phase transition diagram shown in FIG. 36, the ERROR EDT 123 which monitors the output g3 of the channel CH12 checks if the increment operation is normally carried out without causing data slippage or the like failure. If the increment operation is normally carried out, the ERROR DET 123 sends back to the self-monitoring controller 25 a test normal termination signal g4 indicating that the increment test is normally terminated. If the increment operation is not carried out normally, the ERROR DET 123 sends back to the self-monitoring controller 25 a test abnormal termination signal g4 indicative of failure in the increment test.

In accordance with the present invention, the high-level group loopback section, low-level group loopback section, self-loopback section and self-monitoring controller are incorporated in the optical terminal system for testing the functions of the respective components in the receiver device and transmitter device within the optical terminal system, thereby allowing the optical terminal system to self-check the functions of the respective components thereof at the time of power source actuation or at any given time without depending on an external network and without disassembling the optical terminal system. Thus, time and labor required for the setup and maintenance of the optical terminal system can be significantly saved, and the reliability of line connection in a high-capacity communications network can be improved.

What is claimed is:

1. An optical terminal system having self-monitoring function, comprising:

a receiving device including an optical/electric convertor for receiving an optical signal and converting the optical signal into an electric signal, a S/P convertor for converting the electric signal converted by the optical/electric convertor into a parallel electric signal, and a signal state detector for checking if the parallel electric signal is normal, then separating a low-level signal from the parallel electric signal and outputting the low-level signal;

a transmitting device including a signal generator for switching a clock for the low-level electric signal and multiplexing the low-level electric signal into a high-level signal, a P/S convertor for converting the electric signal generated by the signal generator into a serial electric signal, and an electric/optical convertor for converting the serial electric signal into an optical signal and transmitting the optical signal;

a system clock generator for generating a system clock which actuates the receiving device and transmitting device;

a monitoring controller for controlling the receiving device and transmitting device and monitoring an alarm;

a power source for supplying power to the receiving device, transmitting device, system clock generator and monitoring controller;

a high-level group loopback section for connecting the P/S convertor of the transmitting device and the S/P convertor of the receiving device to internally loop back the serial electric signal;

a low-level group loopback section for connecting the signal generator of the transmitting device and the signal state detector of the receiving device to internally loop back the parallel electric signal;

a self-loopback section for connecting the signal state detector of the receiving device and the signal generator of the transmitting device to directly loop back the electric signal received by the receiving device to the transmitting device; and a self-monitoring controller for performing a self-monitoring test on the respective components of the receiving device and transmitting device by using the self-loopback section and either of the high-level group loopback section and low-level group loopback section.

2. An optical terminal system according to claim 1, further comprising a bit shifter, provided between the P/S convertor of the transmitting device and the high-level group loopback section, for shifting the electric signal converted by the P/S convertor by one bit.

3. An optical terminal system according to claim 1, further comprising an array rearranging section, provided between the signal generator of the transmitting device and the low-level group loopback section, for carrying out replacement of the signal generated by the signal generator.

4. An optical terminal system according to claim 1, wherein the self-monitoring test carried out by the self-monitoring controller is automatically started at the time of power supply actuation.

5. An optical terminal system according to claim 1, wherein the self-monitoring test carried out by the self-monitoring controller is started at any given time by the monitoring controller.

6. An optical terminal system according to claim 1, wherein output of the optical signal from the transmitting device is stopped during the self-monitoring test performed by the self-monitoring controller.

7. An optical terminal system according to claim 1, wherein the self-monitoring controller performs the self-monitoring test first by using the high-level group loopback section and then by using the low-level group loopback section.

8. An optical terminal system according to claim 1, further comprising an indicator for indicating a state and result of the self-monitoring test performed by the self-monitoring controller.

9. An optical terminal system according to claim 1, wherein an operational margin of the system for clock frequency is checked by increasing a frequency of the system clock generated by the system clock generator during the self-monitoring test performed by the self-monitoring controller.

10. An optical terminal system according to claim 1, wherein an operational margin of the system for power supply is checked by changing a voltage of the power supplied by the power source during the self-monitoring test performed by the self-monitoring section.

11. An optical terminal system according to claim 1, wherein the receiving device and transmitting device each include a plurality of channels, and the respective channels are tested by connecting the channels in tandem and passing a PN signal through the channels during the self-monitoring test performed by the self-monitoring section.

* * * * *